US010013554B2

(12) United States Patent
Gathala et al.

(10) Patent No.: US 10,013,554 B2
(45) Date of Patent: Jul. 3, 2018

(54) TIME VARYING ADDRESS SPACE LAYOUT RANDOMIZATION

(71) Applicant: QUALCOMM Incorporated, San Diego, CA (US)

(72) Inventors: Sudha Anil Kumar Gathala, Tracy, CA (US); Gheorghe Calin Cascaval, Palo Alto, CA (US); Rajarshi Gupta, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 15/087,198

(22) Filed: Mar. 31, 2016

(65) Prior Publication Data

US 2017/0286674 A1     Oct. 5, 2017

(51) Int. Cl.
| | |
|---|---|
| *H04L 29/06* | (2006.01) |
| *G06F 21/55* | (2013.01) |
| *G06F 3/06* | (2006.01) |
| *G06F 12/1009* | (2016.01) |
| *G06F 17/30* | (2006.01) |
| *G06F 21/52* | (2013.01) |

(52) U.S. Cl.
CPC .......... *G06F 21/554* (2013.01); *G06F 3/0623* (2013.01); *G06F 3/0631* (2013.01); *G06F 3/0653* (2013.01); *G06F 3/0683* (2013.01); *G06F 12/1009* (2013.01); *G06F 17/30138* (2013.01); *G06F 17/30233* (2013.01); *G06F 21/52* (2013.01)

(58) Field of Classification Search
CPC .................................................... G06F 21/554
See application file for complete search history.

(56) References Cited

U.S. PATENT DOCUMENTS

| | | | | |
|---|---|---|---|---|
| 4,875,159 | A | * | 10/1989 | Cary ........................ G06F 8/71 |
| 2013/0013843 | A1 | * | 1/2013 | Radovic ................ G06F 11/073 |
| | | | | 711/5 |
| 2013/0091318 | A1 | | 4/2013 | Bhattacharjee et al. |
| 2015/0032951 | A1 | * | 1/2015 | Goss .................... G06F 12/1408 |
| | | | | 711/105 |

OTHER PUBLICATIONS

Jiang X., et al., "RANDSYS: Thwarting Code Injection Attacks with System Service Interface Randomization," CERIAS Tech Report 2005-78, 2007, 21 pages.

(Continued)

*Primary Examiner* — Shawnchoy Rahman
(74) *Attorney, Agent, or Firm* — Jae-Hee Choi; The Marbury Law Group

(57) ABSTRACT

Embodiments include computing devices, apparatus, and methods implemented by the apparatus for time varying address space layout randomization. The apparatus may launch first plurality of versions of a system service and assign a random virtual address space layout to each of the first plurality of versions of the system service. The apparatus may receive a first request to execute the system service from a first application. The apparatus may randomly select a first version of the system service from the first plurality of versions of the system service, and execute the system service using data of the first version of the system service.

36 Claims, 14 Drawing Sheets

(56) References Cited

OTHER PUBLICATIONS

Tasic M., "Detecting Attacks using Program Alternatives," Jan. 6, 2015, 61 pages.
Wartell R., et al., "Binary Stirring: Self-randomizing Instruction Addresses of Legacy x86 Binary Code," Proceedings of the 2012 ACM Conference on Computer and Communications Security, 2012, pp. 157-168.
Xu H., et al., "Improving Address Space Randomization with a Dynamic Offset Randomization Technique," Proceedings of the 2006 ACM symposium on Applied computing, 2006, pp. 384-391.
Bruschi D., et al., "Universit'a degli Studi di Milano: Diversified Process Replicae for Defeating Memory Error Exploits", Apr. 1, 2007 (Apr. 1, 2007), XP055369106, 19 pages. Retrieved from the Internet: URL: http://www.isg.rhul.ac.uk/sullivan/pubs/tr/diversified-process-replicae_TR1406.pdf [retrieved on May 3, 2017].
Clarke D., et al., "FORTRESS: Adding Intrusion-Resilience to Primary-Backup Server Systems", Reliable Distributed Systems (SRDS), 2012 IEEE 31st Symposium on, IEEE, Oct. 8, 2012 (Oct. 8, 2012), XP032322989, pp. 121-130.
Cox B., et al., "N-Variant Systems: A Secretless Framework for Security through Diversity", Jan. 1, 2006 (Jan. 1, 2006), XP055368659, Retrieved from the Internet: URL: http://www.cs.virginia.edu/-evans/pub/nvariant/usenix06-packaged.pdf [retrieved on May 3, 2017].
International Search Report and Written Opinion—PCT/US2017/019716—ISA/EPO—dated May 12, 2017.
Shacham H., et al., "On the Effectiveness of Address-Space Randomization", Proceedings of the 11th ACM Conference on Computer and Communications Security, CCS 04, Jan. 1, 2004 (Jan. 1, 2004), XP055102914, p. 298.
Lu K., et al., "How to Make ASLR Win the Clone Wars: Runtime Re-Randomization", Proceedings 2016 Network and Distributed System Security Symposium, Jan. 1, 2016 (Jan. 1, 2016), pp. 1-15, XP055448842, Reston, VA, DOI: 1 0.14722/ndss.2016.23173, ISBN: 978-1-891562-41-9.

* cited by examiner

TIME VARYING ADDRESS SPACE LAYOUT RANDOMIZATION

BACKGROUND

Hackers use a variety of strategies for attacking computing devices, including mobile devices. Many strategies involve attempts to identify the memory layout of an application so that known vulnerabilities in system services can be exploited by knowing where the services are located in memory. Such attacks may embody "control hijack attacks" that target system services, such as return oriented programming (ROP). The goal of ROP attacks is privilege escalation and the follow up benefits. Such attacks often employ brute force tactics in which an attacker exhaustively explores the process address space to find vulnerable or gadget code/data locations. Brute force tactics can cause the victim system service of the attack to crash. Another form of attack takes advantage of information leakage. Such techniques exploit format string vulnerabilities to gain certain information (e.g., return addresses and thereby some library function locations). Information leakage of a vulnerable process can compromise another process, particularly processes using dynamic shred libraries. Attacks can combine techniques to more effectively discover exploitable vulnerabilities of the address space used by one or more processes.

Address Space Layout Randomization (ASLR) is a well-known technique of protecting applications against hack attacks by storing different sections of a program in randomly chosen locations in memory at run time and using an address space map to enable program execution. ASLR provides protections against hacking not afforded by conventional application mapping in which program sections are loaded at specific fixed (e.g., contiguous) locations. ASLR makes it difficult for an attacker to find different code locations in the address space of an actively running process. However, ASLR can still be attacked. Even when application code is randomized using ASLR, the information gathered by the attacker in a brute force attack can be used upon re-initialization of the victim system service because the same address space can be used.

SUMMARY

The methods and apparatuses of various embodiments provide apparatuses and methods for time varying address space layout randomization on a computing device, including launching a first plurality of versions of a system service, and assigning a random virtual address space layout to each of the first plurality of versions of the system service. Various embodiments may further include receiving a first request to execute the system service from a first application, randomly selecting a first version of the system service from the first plurality of versions of the system service, and executing the system service using data of the first version of the system service.

Some embodiments may further include receiving a second request to execute the system service from the first application, randomly selecting a second version of the system service from the first plurality of versions of the system service, and executing the system service using data of the second version of the system service.

Some embodiments may include assigning a system service version identifier to each of the first plurality of versions of the system service. The system service version identifier of each of the first plurality of versions of the system service may be different. Various embodiments may further include correlating the system service version identifier of each of the first plurality of versions of the system service to a system service identifier of the system service, and storing the correlations of the system service version identifier of each of the first plurality of versions of the system service and the system service identifier. Various embodiments may further include correlating the system service version identifier of each of the first plurality of versions of the system service with a corresponding one of the random virtual address space layout of each of the first plurality of versions of the system service. Various embodiments may further include storing the correlations of the system service version identifier of each of the first plurality of versions of the system service with a corresponding one of the random virtual address space layouts of each of the first plurality of versions of the system service.

In some embodiments, the first request to execute the system service includes the system service identifier, and randomly selecting a first version of the system service from the first plurality of versions of the system service may include randomly selecting the first version of the system service from the first plurality of versions of the system service correlated with the system service identifier. Various embodiments may further include providing the first application with a first system service version identifier of the first version of the system service, and receiving a request to execute the first version of the system service having the first system service version identifier from the first application.

Some embodiments may further include locating a random virtual address of the first system service version using a correlation between the first system service version identifier and the random virtual address space layout of the first system service version. Such embodiments may further include translating the random virtual address of the first system service version to a physical address at which the data of the first version of the system service is stored, and retrieving the data of the first version of the system service.

Some embodiments may further include assigning a process identifier to each of the first plurality of versions of the system service. In such embodiments, the process identifier for each of the first plurality of versions of the system service may be the same. In such embodiments, assigning a random virtual address space layout to each of the first plurality of versions of the system service, assigning a system service version identifier to each of the first plurality of versions of the system service, and correlating the system service version identifier of each of the first plurality of versions of the system service to a system service identifier of the system service may occur for each of the first plurality of versions of the system service assigned the process identifier.

Some embodiments may further include receiving a request to allocate code buffer space for dynamically generated code of an execution of the first version of the system service, randomly selecting a code buffer address, and determining whether a code buffer space correlated with the code buffer address is large enough and available to store the dynamically generated code. Such embodiments may further include storing the dynamically generated code at the code buffer address in response to determining that the code buffer space is large enough to store the dynamically generated code.

Some embodiments may further include receiving a second request to execute the system service from a second application, detecting that the second request to execute the system service from the second application is an attack on the system service, and launching a second plurality of versions of the system service. Such embodiments may further include assigning a random virtual address space layout to each of the second plurality of versions of the system service. The random virtual address space layout of each of the first plurality of versions of the system service and the random virtual address space layout of each of the second plurality of versions of the system service may be different. Such embodiments may further include randomly selecting a second version of the system service from the first plurality of versions of the system service and the second plurality of versions of the system service, and executing the system service using data of the second version of the system service.

In some embodiments, launching a first plurality of versions of a system service may include launching each of multiple versions of the system service of the first plurality of versions of the system service on one of a plurality of heterogeneous processor cores having different instruction set architectures. In such embodiments, randomly selecting a first version of the system service from the first plurality of versions of the system service may include randomly selecting a first heterogeneous processor core of the plurality of heterogeneous processor cores on which the first version of the system service is launched. In such embodiments, executing the system service using data of the first version of the system service may include executing the system service by the first heterogeneous processor core. Such embodiments may further include transferring the first request to execute the system service from the first application to the first heterogeneous processor core, receiving an output of the execution of the system service by the first heterogeneous processor core, and returning the output to the first application.

Various embodiments may include a computing device having a launcher, a mapper communicatively connected to the launcher, a request coordinator communicatively connected to the launcher, and a processor communicatively connected to the request coordinator. The launcher, the mapper, the request coordinator, and the processor may be configured to perform operations of one or more of the embodiment methods summarized above.

Various embodiments may include a computing device having means for performing functions of one or more of the embodiment methods summarized above.

Various embodiments may include a non-transitory processor-readable storage medium having stored thereon processor-executable instructions configured to cause a processor of a computing device to perform operations of one or more of the embodiment methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
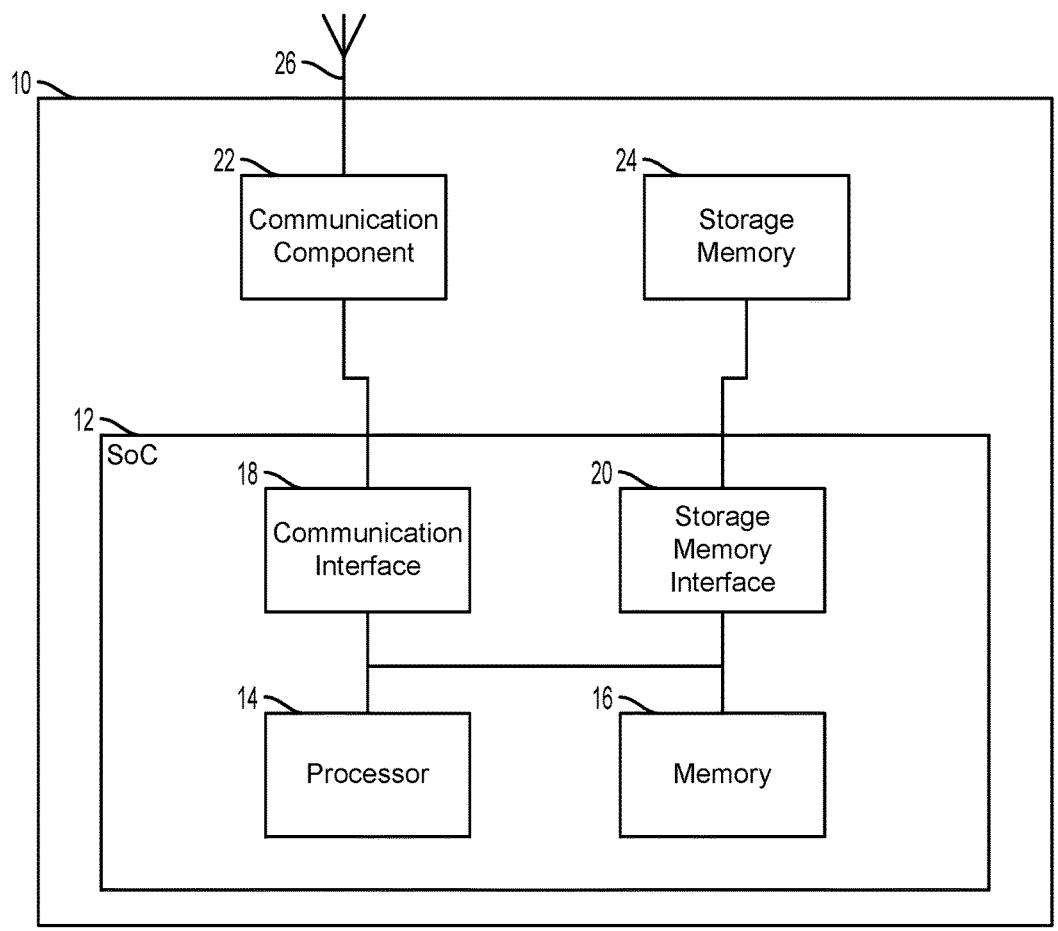
FIG. 1 is a component block diagram illustrating a computing device suitable for implementing an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The term "computing device" may further refer to stationary computing devices including personal computers, desktop computers, all-in-one computers, workstations, super computers, mainframe computers, embedded computers, servers, home theater computers, and game consoles.

Various embodiments include methods, and systems and devices implementing such methods for preventing Address Space Layout Randomization (ASLR) attacks by also randomizing the address space layout of system services used by applications in the time dimension. Various embodiments may include launching multiple versions of a system service, with each version of the system service having a different address space layout that may be chosen at random, and each request for the system service by applications may be directed to a randomly chosen one of the system service versions.

In general, time varying ASLR may create various versions of a system service at boot time of a system or in response to a first request for the system service after booting the system. Each version of the system service may be assigned a randomly generated address space layout. Each address space layout for each system service may store items for implementing the corresponding system service, including storing process stacks, heaps, data, and function pointers or library memory maps. The address spaces for each version of the system services may be created in a virtual address space, and each virtual address space may have a different memory mapping to the code of the system service, e.g., the code library for the system service, stored in physical address space. A request coordinator may be implemented to receive requests for the system services, and to randomly assign one of the various versions of the system service to execute the requested system service.

To time vary the ASLR, each time a request is received for the same system service, the request coordinator may make a random assignment to one of the versions of the system service corresponding to the requested system service. This is referred to as time varying ASLR, and is accomplished by randomly assigning the different versions of the system service for each request for the system service. When time varying ASLR of the various embodiments is implemented, an attacker executing a brute force attack will observe a different virtual address space for each request that the attacker submits for the system service. Also, leaked information will become more difficult to use because the obtained information for one version of the system service will not apply to the other versions of the system service. This will greatly increase the number of attempts needed for a successful brute force attack on a system service.

In some embodiments, the request coordinator may be configured to detect or suspect an attack by monitoring requests to recognize unusual request patterns. When an attack is detected or suspected, the request coordinator may create new copies of the system service (or multiple system services) and store the new copies using random address space layouts, thereby further increasing the randomness in the ASLR system.

For coarse-grained time varying ASLR, the start locations of a heap, a stack, an executable, shared libraries, etc. may change for the varying versions of the same system service. In an example system, a user space component, such as a launcher, may launch the multiple versions of the same system service. Each version may be launched as a separate process with a different address space layout. The different versions may be included in a process group and may be associated with the same process group identifier (process group ID). A kernel space mapping function may use the process group ID to recognize all processes that are versions of the system service and map each process to a different random address space layout.

During the creation process and the mapping phase, the kernel code may ensure that the new randomly generated addresses do not conflict with any of the existing versions of the system service. Each version of the system service may be assigned a system service version identifier, such as a handle, a label, or other reference, which is used to uniquely recognize the version of the system service and the object's actual address.

Applications run by the system may lookup system services using a lookup method to retrieve a system service version identifier for a version of the system service or process. The request coordinator may return a randomly selected system service version identifier corresponding to a version of the requested system service to the requesting application. The application may use this system service version identifier in all of its calls to the system service. The request coordinator may return different randomly selected system service version identifiers for different executions of the lookup method for the same system service.

For fine-grained time varying ASLR in a system service having dynamically generated code within a virtual machine, the locations of different pieces of dynamic code in a code-buffer may be positioned at random locations in the code-buffer (including the start of the code buffer). The randomization of the dynamic code in the code-buffer may be implemented by a random memory allocator using memory allocation functions of built-in code libraries or implemented in a similar manner by a random memory allocator of the kernel. In either instance, the random memory allocator may maintain a list of system service version identifiers identifying the version of the system service and assigned buffer addresses for the dynamic code for each version of the system service. When a different version of a system service identified by the system service version identifiers attempts to allocate a buffer address of size n bytes, the random memory allocator may traverse the list for each version and determine whether there is a buffer address that is not used for an version of the system service, and assign an unused buffer address for the system service version identifiers.

FIG. 1 illustrates a system including a computing device 10 in communication with a remote computing device 50 suitable for use with the various embodiments. The computing device 10 may include a system-on-chip (SoC) 12 with a processor 14, a memory 16, a communication interface 18, and a storage memory interface 20. The computing device may further include a communication component 22 such as a wired or wireless modem, a storage memory 24, an antenna 26 for establishing a wireless communication link. The processor 14 may include any of a variety of hardware cores, for example a number of processor cores.

The term "system-on-chip" (SoC) is used herein to refer to a set of interconnected electronic circuits typically, but not exclusively, including a hardware core, a memory, and a communication interface. A hardware core may include a variety of different types of processors, such as a general purpose processor, a central processing unit (CPU), a digital signal processor (DSP), a graphics processing unit (GPU), an accelerated processing unit (APU), an auxiliary processor, a single-core processor, and a multi-core processor. A hardware core may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

An SoC 12 may include one or more processors 14. The computing device 10 may include more than one SoCs 12, thereby increasing the number of processors 14 and processor cores. The computing device 10 may also include processors 14 that are not associated with an SoC 12. Individual processors 14 may be multi-core processors as described below with reference to FIG. 2. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The memory 16 of the SoC 12 may be a volatile or non-volatile memory configured for storing data and processor-executable code for access by the processor 14. The computing device 10 and/or SoC 12 may include one or more memories 16 configured for various purposes. One or more memories 16 may include volatile memories such as random access memory (RAM) or main memory, or cache memory. These memories 16 may be configured to temporarily hold a limited amount of data received from a data sensor or subsystem, data and/or processor-executable code instructions that are requested from non-volatile memory, loaded to the memories 16 from non-volatile memory in anticipation of future access based on a variety of factors, and/or intermediary processing data and/or processor-executable code instructions produced by the processor 14 and temporarily stored for future quick access without being stored in non-volatile memory.

The memory 16 may be configured to store data and processor-executable code, at least temporarily, that is loaded to the memory 16 from another memory device, such as another memory 16 or storage memory 24, for access by one or more of the processors 14. The data or processor-executable code loaded to the memory 16 may be loaded in response to execution of a function by the processor 14. Loading the data or processor-executable code to the memory 16 in response to execution of a function may result from a memory access request to the memory 16 that is unsuccessful, or a miss, because the requested data or processor-executable code is not located in the memory 16. In response to a miss, a memory access request to another memory 16 or storage memory 24 may be made to load the requested data or processor-executable code from the other memory 16 or storage memory 24 to the memory device 16. Loading the data or processor-executable code to the memory 16 in response to execution of a function may result from a memory access request to another memory 16 or storage memory 24, and the data or processor-executable code may be loaded to the memory 16 for later access.

The memory 16 may be configured to store raw data, at least temporarily, that is loaded to the memory 16 from a raw data source device, such as a sensor or subsystem. Raw data may stream from the raw data source device to the memory 16 and be stored by the memory until the raw data can be received and processed by a machine learning accelerator as described further herein with reference to FIGS. 3-19.

The storage memory interface 20 and the storage memory 24 may work in unison to allow the computing device 10 to store data and processor-executable code on a non-volatile storage medium. The storage memory 24 may be configured much like an embodiment of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

Some or all of the components of the computing device 10 may be differently arranged and/or combined while still serving the necessary functions. Moreover, the computing device 10 may not be limited to one of each of the components, and multiple instances of each component may be included in various configurations of the computing device 10.

Figure 2:
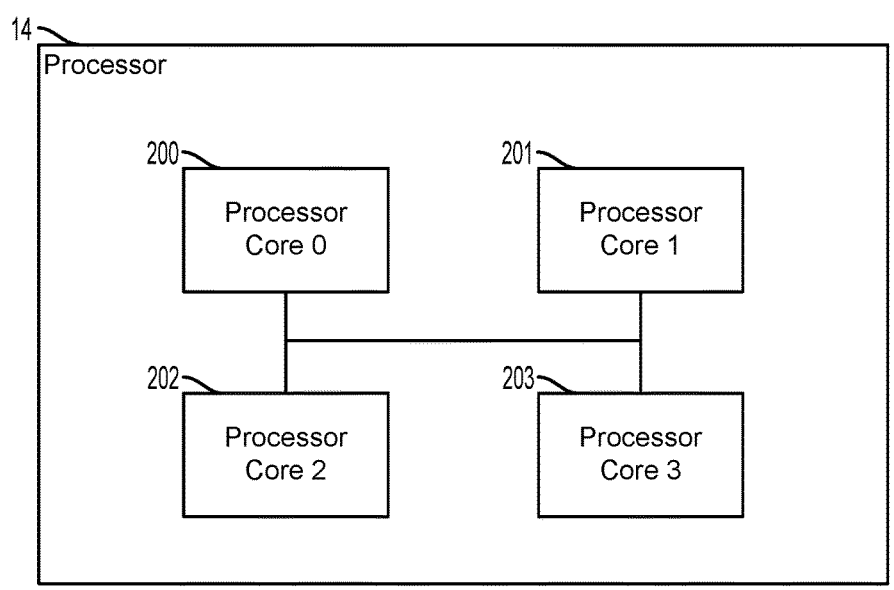
FIG. 2 is a component block diagram illustrating an example multi-core processor suitable for implementing an embodiment.

FIG. 2 illustrates a multi-core processor 14 suitable for implementing an embodiment. The multi-core processor 14 may have a plurality of homogeneous or heterogeneous processor cores 200, 201, 202, 203. The processor cores 200, 201, 202, 203 may be homogeneous in that, the processor cores 200, 201, 202, 203 of a single processor 14 may be configured for the same purpose and have the same or similar performance characteristics. For example, the processor 14 may be a general purpose processor, and the processor cores 200, 201, 202, 203 may be homogeneous general purpose processor cores. Alternatively, the processor 14 may be a graphics processing unit or a digital signal processor, and the processor cores 200, 201, 202, 203 may be homogeneous graphics processor cores or digital signal processor cores, respectively. For ease of reference, the terms "processor" and "processor core" may be used interchangeably herein.

The processor cores 200, 201, 202, 203 may be heterogeneous in that, the processor cores 200, 201, 202, 203 of a single processor 14 may be configured for different purposes and/or have different performance characteristics. The heterogeneity of such heterogeneous processor cores may include different instruction set architecture, pipelines, operating frequencies, etc. An example of such heterogeneous processor cores may include what are known as "big.LITTLE" architectures in which slower, low-power processor cores may be coupled with more powerful and power-hungry processor cores. In similar embodiments, the SoC 12 may include a number of homogeneous or heterogeneous processors 14.

In the example illustrated in FIG. 2, the multi-core processor 14 includes four processor cores 200, 201, 202, 203 (i.e., processor core 0, processor core 1, processor core 2, and processor core 3). For ease of explanation, the examples herein may refer to the four processor cores 200, 201, 202, 203 illustrated in FIG. 2. However, the four processor cores 200, 201, 202, 203 illustrated in FIG. 2 and described herein are merely provided as an example and in no way are meant to limit the various embodiments to a four-core processor system. The computing device 10, the SoC 12, or the multi-core processor 14 may individually or in combination include fewer or more than the four processor cores 200, 201, 202, 203 illustrated and described herein.

Figure 3:
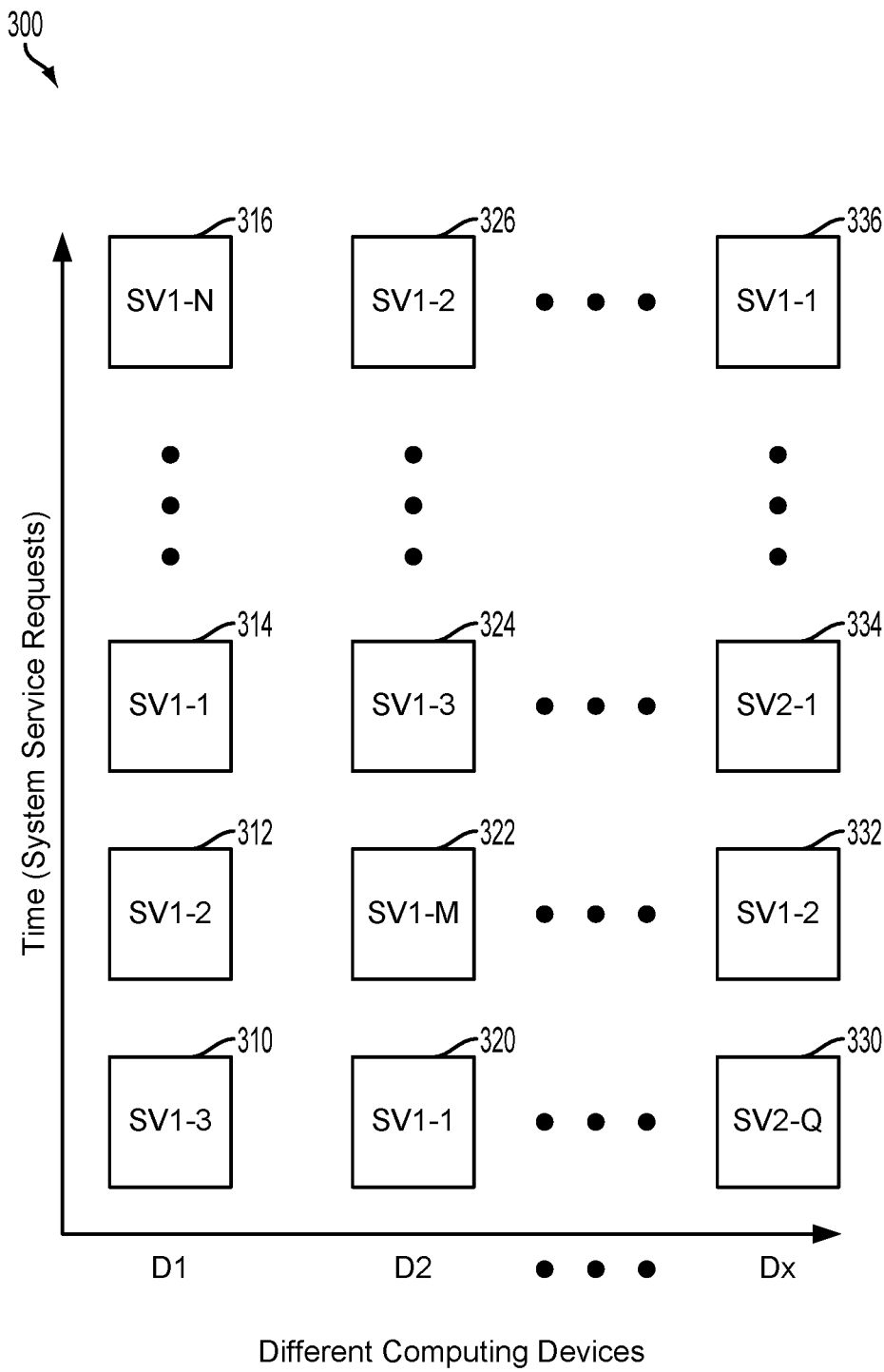
FIG. 3 is a graphical diagram illustrating an example of time varying address space layout randomization generating various versions of system services.

FIG. 3 illustrates a non-limiting example of time varying ASLR generating various versions of system services stored in memory according to some embodiments. The graph 300 in FIG. 3 includes a horizontal axis along which different computing devices are designated, for example computing devices D1, D2, up to Dx for any integer value of "x". The graph 300 also includes a vertical axis, representing increasing time and different system service requests throughout the represented time. Plotted in the graph 300 are various versions of multiple system services 310-336 requested on each of the different computing devices assigned at different time in response to different system service requests. For example, computing device D1 is illustrated as making multiple system service requests over time for a single system service (S1) and receiving in response different versions of the system service S1 (SV1-1 314, SV1-2 312, SV1-3 310, up to SV1-N 316 for any integer value of "N"). In various implementations, each of the different versions of the system service S1 310-316 may be randomly assigned in response to a system service request for the system service S1, and may be located at a different virtual memory address from the other versions of the system service S1 310-316.

The graph 300 further illustrates computing device D2 making multiple system service requests over time for a single system service (S1) and receiving in response different versions of the system service S1 (SV1-1 320, SV1-2 326, SV1-3 324, up to SV1-M 322 for any integer value of "M"). As with computing device D1, in various implementations, each of the different versions of the system service S1 320-326 may be randomly assigned in response to a system service request for the system service S1, and may be located at a different virtual memory address from the other versions of the system service S1 320-326. Because of the random assignment of the different versions of the system service S1 320-326, the example in the graph 300 illustrates that the different versions of the system service S1 320-326 of computing device D2 are assigned in a different order over time than the different versions of the system service S1 310-316 of computing device D1. Although the different versions of the system service S1 310-316 and 320-326 share system service version identifiers (e.g., SV1-1, SV1-2, SV1-3), the individual implementation of each of the correspondingly identified versions of the system service S1 310-316 and 320-326 may be different. For example, each implementation of the correspondingly identified versions of the system service S1 310-316 and 320-326 may be assigned a different random virtual address space layout, and may contain different data for different implementations or versions of the system service S1 310-316 and 320-326 on their respective computing devices D1 or D2.

The graph 300 further illustrates computing device Dx making multiple system service requests over time for multiple system services (S1 and S2) and receiving in response different versions of the system services S1 and S2 (SV1-1 336, SV1-2 332, SV2-1 334, up to SV2-Q 330 for any integer value of "Q"). The example in graph 300 illustrates that the same system service S1 requested by computing devices D1 and D2 is also requested by computing device D3. The different versions of the system service S1 332 and 336 may differ from the different versions of the system service S1 310-316 and 320-326 in the same manner. The different versions of the system service S2 330 and 334 may be similarly randomly assigned virtual address space layouts, contain different data for different implementations the version of the system service S2 310-316 and 320-326, and be randomly selected in response to a system service request for system service S2.

The example illustrated in FIG. 3 is non-limiting, and a computing device may have any number of versions of any number of system services. Various versions of system services may be assigned any number of times in response to multiple system service requests for the corresponding system service.

Figure 4A:
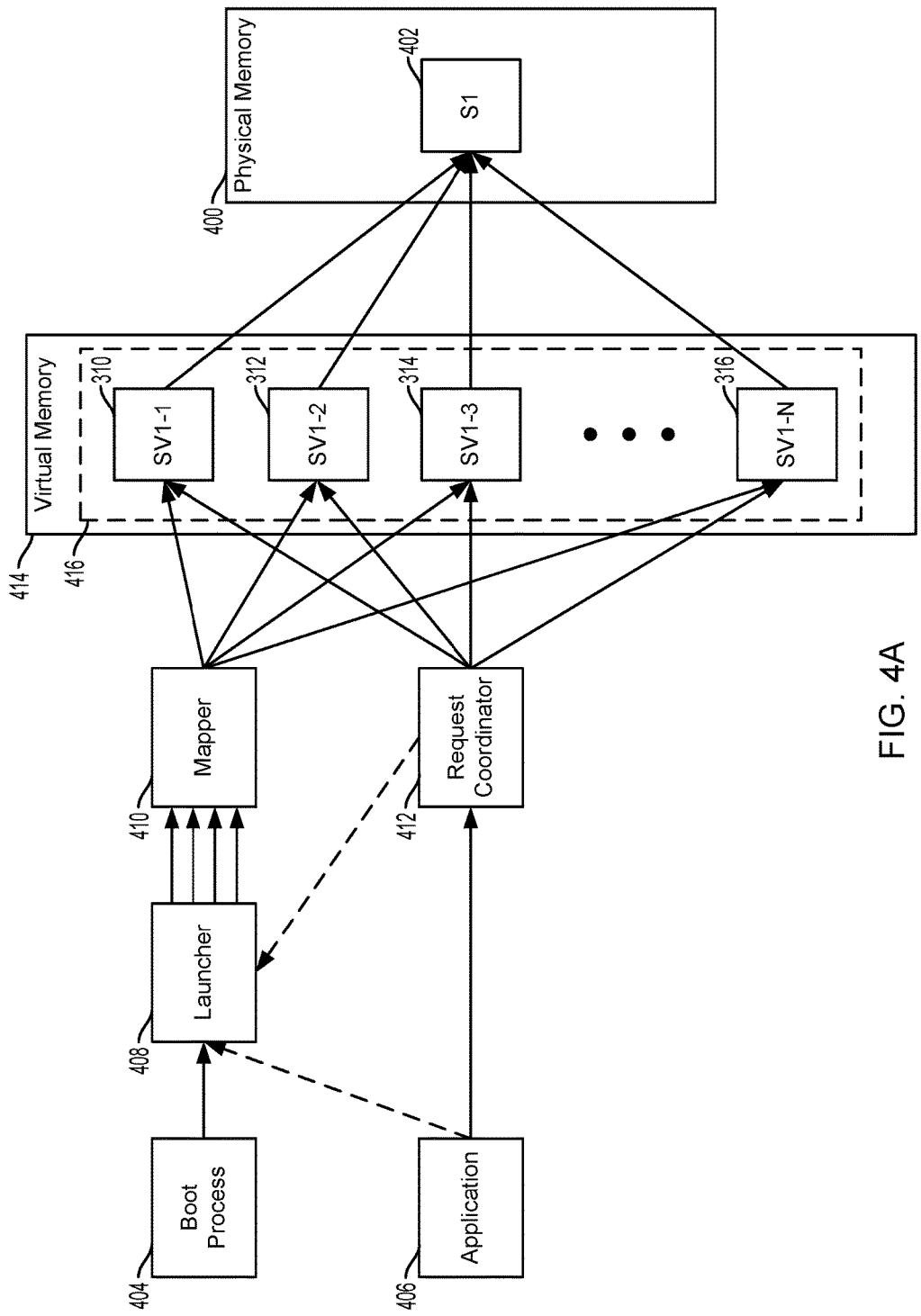
FIG. 4A is a component block and signaling diagram illustrating an example time varying address space layout randomization system suitable for implementing an embodiment.

FIG. 4A illustrates an example time varying ASLR system suitable for implementing various embodiments. A computing device may include various forms of a physical memory 400, such as the memory 16 and storage memory 24 described with reference to FIG. 1. The physical memory 400 may store code of various system services, such as the code for system service S1 402.

The computing device may attempt to access the code for system service S1 402 at various times. For example, a boot process 404 executed on the computing device may attempt to access the code for system service S1 402 during a boot time. An application 406 executing on the computing device may also attempt to access the code for system service S1 402 during any time the computing device is powered on and capable of executing the application 406.

To implement time varying ASLR, multiple versions of a system service 310-316 may be launched by a launcher 408 in response to a system service request by either the boot process 404 or the application 406. In various implementations, the computing device may be preprogrammed so that the boot process 404 makes the system service request for any number of system services resulting in the launching of the various versions of those system services 310-316.

In various implementations, the application 406 may make a system service request for a system service that has already been launched and various versions of the system service may already be launched. In various implementations, the launcher 408 may refrain from launching further versions of the system service when more than one version of the system service already exists. In various implementations, the launcher 408 may launch a limited number of versions of the system service when one or more versions of the system service already exist.

In various implementations, the application 406 may make a system service request for a system service that does not have a version of the system service launched at the time. For example, the requested system service may not have been requested during a power on session of the computing device prior to the system service request by the application. Similarly, previous versions of the system service launched during the power on session of the computing device may have been discarded for various reasons, such as lack of use, limited memory space, limited computing device power, and other replacement policies and algorithms. When no versions of the requested system service are in existence at the time of the system service request by the application 406, the launcher 408 may launch a designated number of versions of the requested system service.

As described herein, the launcher 408 may be responsive to system service requests from multiple sources and may launch a designated number of versions of the requested system service. The number of versions of the requested system service may vary based on preprogrammed values, measured or expected used of the requested system service, a priority or vulnerability of the requested system service, state of the computing device (including memory space and power availability), or a detected or suspected threat to the system service, as described further herein with reference to request coordinator 412. Each version of a system service may be associated by the launcher 408 with a same process group identifier (ID) as each of the other versions of the same system service. The process group identifier may define a process group 416 including the versions of the requested system service 310-316 having the same process group identifier.

The launcher 408 may launch different versions of a system service to be run on designated heterogeneous processors. For example, a first version of a system service that is launched may be configured to be executed by a CPU of a computing device, and a second version of the system service that is launched may be configured to be executed by a DSP of the computing device. The launcher 408 may launch different versions of a system service to be executed by any type of processor. The various versions of the system service to be executed on heterogeneous processors may help obfuscate the system service from an attacker by requiring different instruction sets for implementation of the versions by different processors. An attacker attempting to execute a version of the system service of a first processor by using data from an executed version of a second processor may not provide the right data or the data in the right format to execute the version of the system service using the instruction set for the first processor.

The computing device may include a mapper 410, which may be configured to map the various versions of the system services 310-316 to a virtual memory 414. The mapper 410 may be configured to randomly select virtual memory address space layouts for the various versions of the system services 310-316 and map the various versions of the system services 310-316 to randomly selected virtual address space layouts that are available to store the versions of the system services 310-316. The mapper 410 may randomly select a different virtual address space layout for a version of a system service 310-316 in response to prior random selection resulting in a virtual address space layout that is unavailable for storing the version of the system service 310-316. The mapper 410 may also correlate the virtual address space layout with a system service version identifier for the corresponding version of the system service 310-316, and store the correlated information for assigning and locating the version of the system service 310-316 in response to a system service request. The mapper 410 may also provide mappings for the virtual address space layouts of the various versions of the system services 310-316 to the physical address of the corresponding system service 402 in the physical memory 400. The mapping of the various versions of the system services 310-316 to the corresponding system service 402 may be used to provide the data of the version of the system services 310-316 to the system service 402 for execution of the system service 402.

The mapper 410 may also map the virtual address space layout for the version of the system service 310-316 to physical addresses of the version of the system service 310-316 where the data of the version of the system service 310-316 is stored. The data of the version of the system service 310-316 may include heaps, stacks, executables, shared libraries, etc. for implementing the version of the system service 310-316. The computing device may retrieve the data of the version of the system service 310-316 using the virtual address space layout of the version of the system service 310-316, and execute the system service 402 using the data of the version of the system service 310-316. In some implementations, the data of the version of the system service 310-316 may include a reference, such as a pointer, for locating the system service 402 in the physical memory 400.

The computing device may include a request coordinator 412 that may be configured to receive system service requests from the application 406. The system service request may be for a specific system service, such as system service S1 402. The request coordinator 412 may use a system service identifier (e.g., a name, a handle, a label, or other reference) of the system service included in the system service request to match the requested system service with the versions of the system service 310-316. The request coordinator 412 may randomly select one of the versions of the system service 310-316 to use in executing the requested system service. The request coordinator 412 may retrieve the virtual address of the randomly selected version of the system service 310-316, such as a starting virtual address of the randomly selected virtual address space layout, to locate and retrieve the data of the version of the system service 310-316. For a randomly selected version of the system service 310-316 configured to be executed by a designated processor, the request coordinator 412 may randomly select a heterogeneous processor having a version of the system service and may use interprocessor messages to send and receive messages, including the received system service request and outputs of the version of the system service executed by the heterogeneous processor, to and from the version on the heterogeneous processor and the boot process 404 or the application 406 issuing the system service request.

In various implementations, varying numbers of launched versions of the system service may be in different states of activity. The activity states may include a wake state, a sleep state, and various quasi wake/sleep states. In a wake state, a version of the system service may be randomly selectable by the request coordinator 412 for use in executing the requested system service. In a sleep state, a version of the system service may be unselectable or less readily randomly selectable than a higher activity state version by the request coordinator 412 for use in executing the requested system service. In one of the various quasi wake/sleep states, a version of the system service may be randomly selectable by the request coordinator 412 for use in executing the requested system service. The request coordinator 412 may prioritize a version of the system service in a wake state or in a higher level quasi wake/sleep state over a version of the system service in a lower level quasi wake/sleep state or a sleep state. Versions of the system service in quasi wake/sleep states may be less quickly accessible and/or require more power to bring to a wake state in order to execute than versions in a wake state. Similarly, versions of the system service in a sleep state may take more time and/or more power to bring to a wake state than a quasi-wake/sleep state version.

The request coordinator 412 may control whether a version of the system service is in a wake state, a quasi-wake/sleep state, or a sleep state depending on various factors. For example, such factors may include an activity state of a processor, the computing device, and/or an application, a power state of the computing device, a number of recent and/or expected calls to the system service, and/or a threat state of the processor, computing device, and/or the application. The more likely multiple calls may be made for the system service based on the various factors, the higher the number of versions of the system service the request coordinator 412 may control to be in a wake state and/or a quasi-wake/sleep state. Using the example factors, the higher the activity state of the processor, the computing device, and/or the application, the higher the number of versions of the system service that may be in a wake state and/or a quasi-wake/sleep state. Similarly, the higher the number of recent and/or expected calls to the system service, the higher the number of versions of the system service that may be in a wake state and/or a quasi-wake/sleep state. The more power available to the computing device, the higher the number of versions of the system service that may be in a wake state and/or a quasi-wake/sleep state. Also, the higher the threat state of the processor, computing device, and/or the application, indicating vulnerability or a possible attack, the higher the number of versions of the system service that may be in a wake state and/or a quasi-wake/sleep state.

There may be limits set for a total number of versions of the system service, a number of versions in a wake state, a number of versions in a quasi-wake/sleep state, and/or a number of versions in a sleep state. The limits may vary depending on profiles used to control the number of versions of the system service in total and in the various states. The profiles may include predetermined limits or may assign limits based on the various factors.

In some implementations, the request coordinator 412 may detect or suspect potential attacks aimed at the requested system service. The request coordinator 412 may detect unusual access patterns and system service requesters. In response to detecting or suspecting a potential attack, the request coordinator 412 may send an alert signal to the launcher 408, prompting the launcher 408 to launch and/or increase the activity state of more versions of the requested system service. The additionally launched and/or increased activity state versions of the requested system service may act to further obfuscate the system service from an attacker by generating more views of different data for unrelated executions of the system service. The additional data and lack of consistency among the data help prevent an attacker from getting data that may be used to exploit the system service because using data from one execution may not correspond to a later execution using a different version of the system service in response to a malicious system service request. Using such non-corresponding data in a malicious system service request may result in an invalid attempt to execute the system service, preventing the execution of the system service.

Figure 4B:
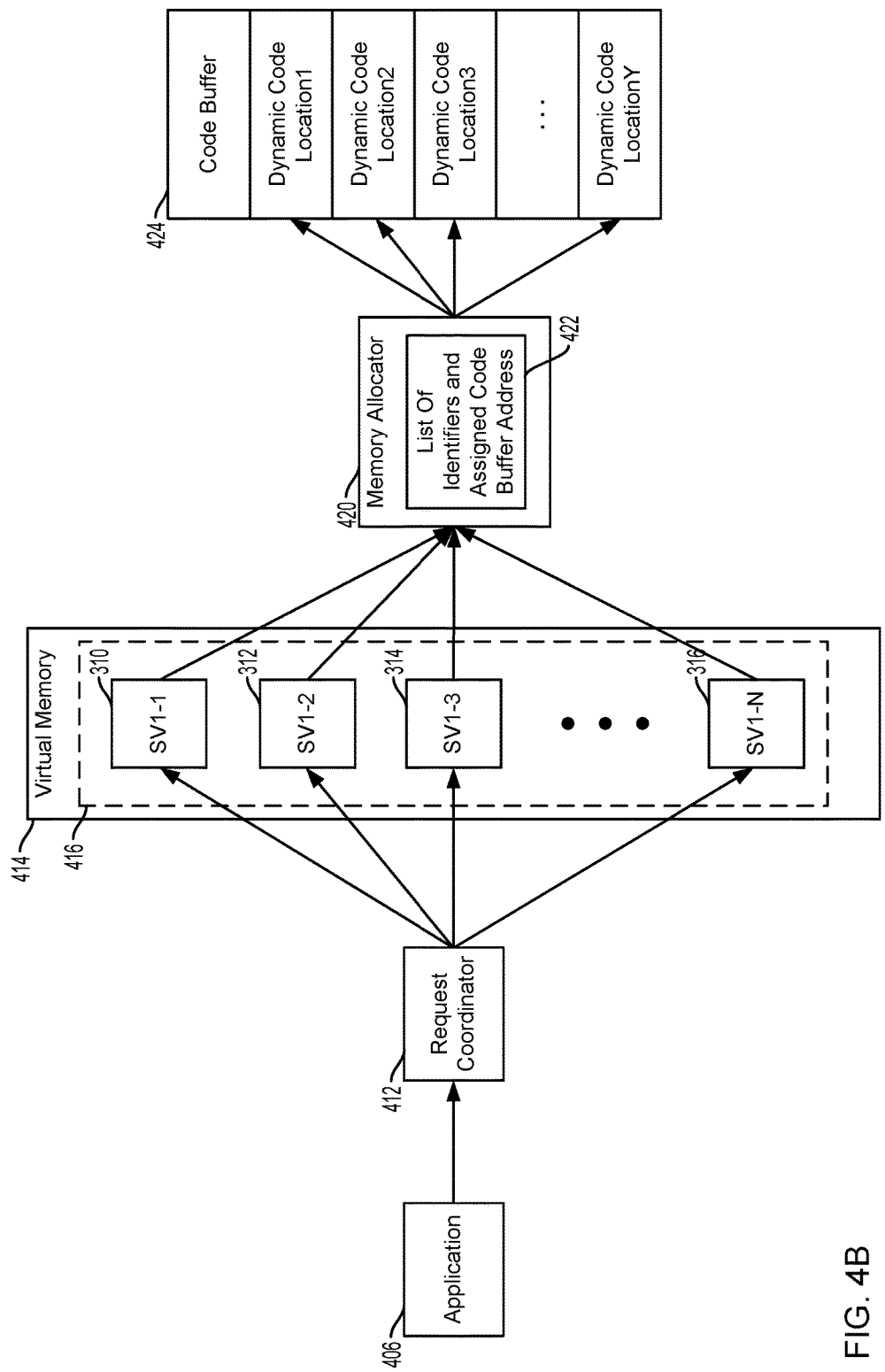
FIG. 4B is a component block and signaling diagram illustrating an example time varying address space layout randomization system with dynamic code generation system suitable for implementing an embodiment.

FIG. 4B illustrates an example of time varying ASLR system with a dynamic code generation system suitable for implementing some embodiments. The computing device may include a memory allocator 420 implemented in a user space or a kernel space, and a code buffer 424 for storing dynamically generated code for executing system services. The memory allocator 420 may be configured to store a list 422 (or other data structure configured to link one data with another data) of the system service version identifiers correlated with a code buffer address corresponding to the dynamically generated code for executing correlated system service.

An execution of a version of the system service 310-316 may result in dynamically generated code for the system service 402. The dynamically generated code may be stored in the code buffer 424 for access to the generated code for use in a later execution of the system service without having to dynamically generate the code again. The memory allocator 420 may receive parameters for storing the dynamically generated code, including a system service version identifier of the corresponding system service, and a size of the dynamically generated code. The memory allocator 420 may traverse the code buffer 424 to find a location of sufficient size and availability to store the dynamically generated code. The memory allocator 420 may traverse the code buffer 424 using various algorithms or patterns, including random selection of code buffer addresses. Upon finding a large enough location, the memory allocator 420 may compare the addresses of the location in the code buffer 424 to the list 422 to determine whether any addresses of the location are already associated with a system service version identifier. Locations that are not associated with a system service version identifier may be available locations for storing dynamically generated code. Upon finding a large enough and available location in the code buffer 424, the memory allocator 420 may provide the code buffer address for storing the dynamic code in a dynamic code location (e.g., Dynamic Code Locations 1 through Y) of the code buffer 424, and update the list 422 to reflect the storage of the dynamically generated code at the code buffer address. The code buffer address may be stored along with the other data of the version of the system service 310-316 for which the execution thereof resulted in the dynamically generated code.

Figure 5:
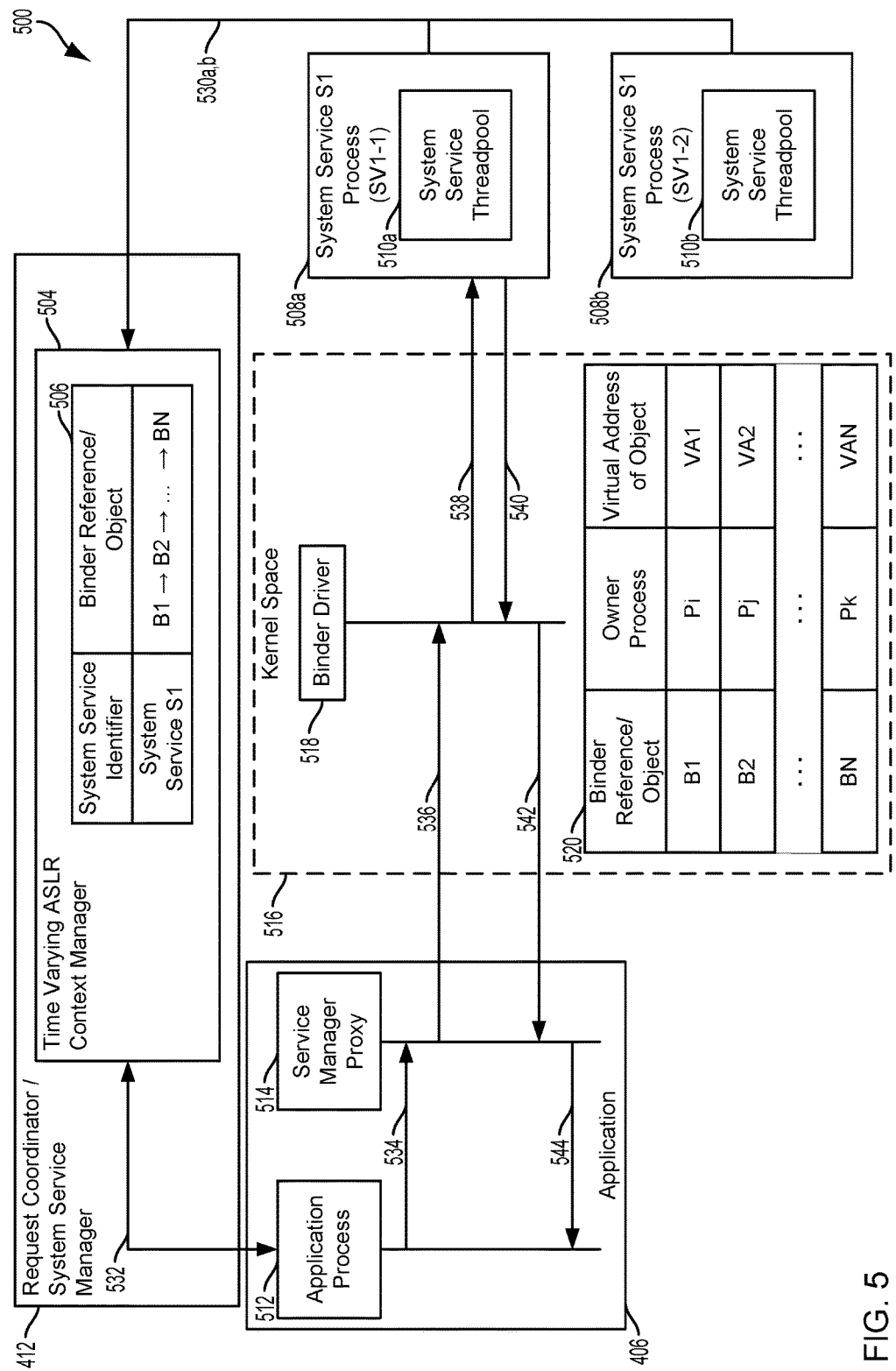
FIG. 5 is a component block and signaling diagram illustrating an example time varying address space layout randomization system suitable for implementing an embodiment of executing a version of a system service.

FIG. 5 illustrates an example time varying ASLR system suitable for implementing some embodiments for executing a version of a system service. The system may include a user space 500 and a kernel space 516. In the user space 500 multiple system service processes, for example system service S1 process 508a, 508b, may be implemented for executing different versions of a system service, for example system service S1 process 508a may execute system service version SV1-1 and system service S1 process 508b may execute system service version SV1-2. Each system service process 508a, 508b may include a system service thread pool 510a, 510b for executing code of the corresponding system service process 508a, 508b. Upon launching the versions of the system service, the system service process 508a, 508b may send a registration signal 530a, 530b, to register the corresponding version of the system service with a request coordinator 412, or system service manager.

The request coordinator 412 may be configured to register versions of the system services and provide assigned versions of the system services to a requesting application 406. In some implementations, the application 406 may run in the user space 500. The request coordinator 412 may include a time varying ASLR context manager 504 for handling the storage and updating of the information used to correlate the system service with the versions of the system service, and the random selection of the versions of the system services. The time varying ASLR context manager 504 may use a registration table 506, or other data structure configured to link one data with multiple other data, to correlate a system service identifier, with binder references (handles or labels) or objects of the multiple versions of the system service. The registration table 506 may include one or more entries for each system service identifier correlating the system service identifier with at least one binder reference/object. The non-limiting example in FIG. 5 shows an entry for the system service identifier, system service S1, correlated with a list of binder references each corresponding to different version of the system service, including B1 for system service version SV1-1, B2 for system service version SV1-2, up to BN for any integer value of "N".

Functions of the kernel space 516 may be implemented by a processor of the computing device (e.g., the processor 14 in FIGS. 1 and 2). The kernel space 516 may include a mapping table 520, or other data structure configured to link one data with multiple other data, to correlate the binder reference of the multiple versions of the system services with an owner process and a virtual address of an object of the version of the system service. The mapping table 520 may be populated and updated when a version of the system service is launched. The non-limiting example in FIG. 5 shows entries in the mapping table 520 for the binder references of the registration table 506. The binder reference B1 is correlated in the mapping table 520 with an owner process Pi, and a virtual address VA1. Similarly, the binder reference B2 is correlated with an owner process Pj and a virtual address VA2, and the binder reference BN is correlated with an owner process Pk and a virtual address VAN.

An application process 512 of the application 406 may send a request for a version of a system service 532 using the system service identifier of the requested system service. The request coordinator 412 may receive the request for the version of a system service 532. The time varying ASLR context manager 504 may randomly select one of the binder references correlated with the system service identifier of the requested system service in the registration table 506.

In some implementations, the time varying ASLR context manager 504 may keep track of pervious assignments of versions of the requested system service to the application 406, and may randomly select binder references not previously provided to the application 406. The time varying ASLR context manager 504 may avoid assigning a previously provided binder reference. For example, the time varying ASLR context manager 504 may avoid assigning a previously provided binder reference by discounting previously provided binder references prior to the random selection. As another example, the time varying ASLR context manager 504 may avoid assigning a previously provided binder reference by making a subsequent random selection in response to randomly selecting a previously provided binder reference.

The request coordinator 412 may return the randomly selected binder reference to the application 406. The application 406 may receive the randomly selected binder reference correlated with the system service identifier of the requested system service, and use the binder reference to call the requested system service 534.

A service manager proxy 514 of the application 406 may interface with the kernel space 516 to access the version of the requested system service. The service manager proxy 514 may provide the binder reference with a call for the version of the requested system service 536. A binder driver 518 in the kernel space 516 may receive the call for the version of the requested system service 536, using the binder reference to locate the virtual address of the object of the version of the requested system service correlated with the binder reference. The binder driver 518 may communicate with the corresponding system service process 508a, 508b for the version of the requested system service. In doing so, the binder driver 518 may request execution of the version of the requested system service 538 using the data of the version of the requested system service from the virtual address correlated with the binder reference.

The corresponding system service process 508a, 508b may return a result of the execution of the requested system service 540 upon completion of the execution using the data of the designated version of the system service by the system service process 508a, 508b. The binder driver 518 may forward the result 542 to the service manager proxy 514, which may forward the result 544a to the application process 512.

Figure 6:
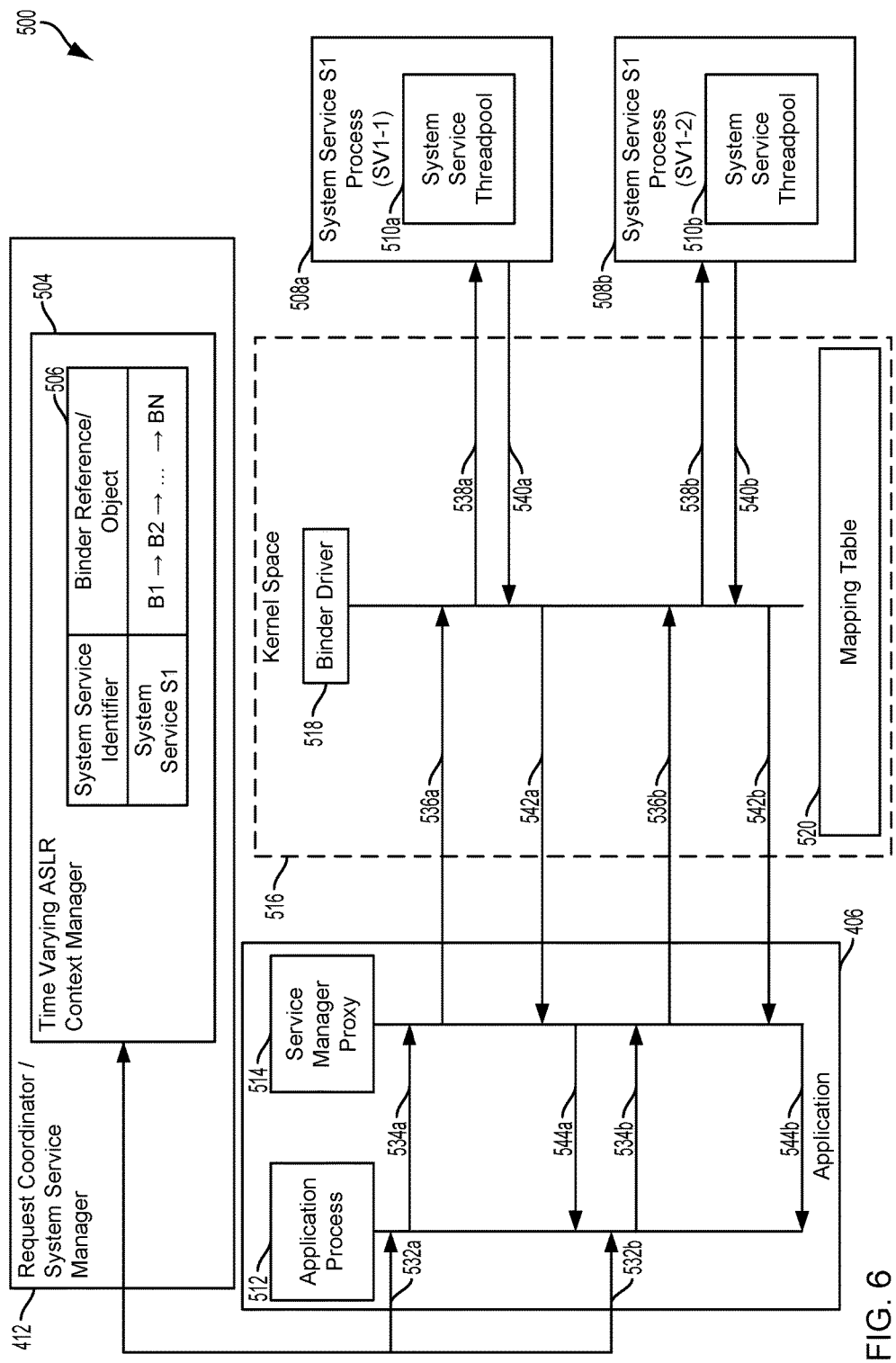
FIG. 6 is a component block and signaling diagram illustrating an example time varying address space layout randomization system suitable for implementing an embodiment of executing multiple versions of a system service.

FIG. 6 illustrates an example time varying ASLR system suitable for implementing an embodiment of executing multiple versions of a system service. The example shown in FIG. 6 is similar to the example described above with reference to FIG. 5. Both examples share the same components, and communication signals 532a, 534a, 536a, 538a, 540a, 542a, and 544a, representing a first request to execute a system service, may correspond to the communication signals 532, 534, 536, 538, 540, 542, and 544, described with reference to FIG. 5. The example shown in FIG. 6 further includes a second request to execute a system service.

The application process 512 may send a second request for a version of the same system service 532b using the system service identifier of the requested system service. The request coordinator 412 may receive the second request for the version of the system service 532b. The time varying ASLR context manager 504 may randomly select one of the binder references correlated with the system service identifier of the requested system service in the registration table 506. As described with reference to FIG. 5, the time varying ASLR context manager 504 may keep track of pervious assignments of versions of the requested system service to the application 406, for example, a first assignment for the first request to execute a system service. The time varying ASLR context manager 504 may randomly select a second binder reference not previously provided to the application 406. The request coordinator 412 may return the randomly selected second binder reference to the application 406.

The application 406 may receive the randomly selected second binder reference correlated with the system service identifier of the requested system service, and use the second binder reference to call the requested system service 534b. The service manager proxy 514 may interface with the kernel space 516 to access the version of the requested system service providing the second binder reference with a call for the version of the requested system service 536b. The binder driver 518 may receive the call for the version of the requested system service 536b, using the second binder reference to locate the virtual address of the object of the version of the requested system service correlated with the second binder reference. The binder driver 518 may communicate with the corresponding system service process 508b for the version of the requested system service. In doing so, the binder driver 518 may request execution of the version of the requested system service 538b using the data of the version of the requested system service from the virtual address correlated with the second binder reference.

The corresponding system service process 508b may return a result of the execution of the requested system service 540b upon completion of the execution using the data of the designated version of the system service by the system service process 508b. The binder driver 518 may forward the result 542b to the service manager proxy 514, which may forward the result 544b to the application process 512.

Figure 7:
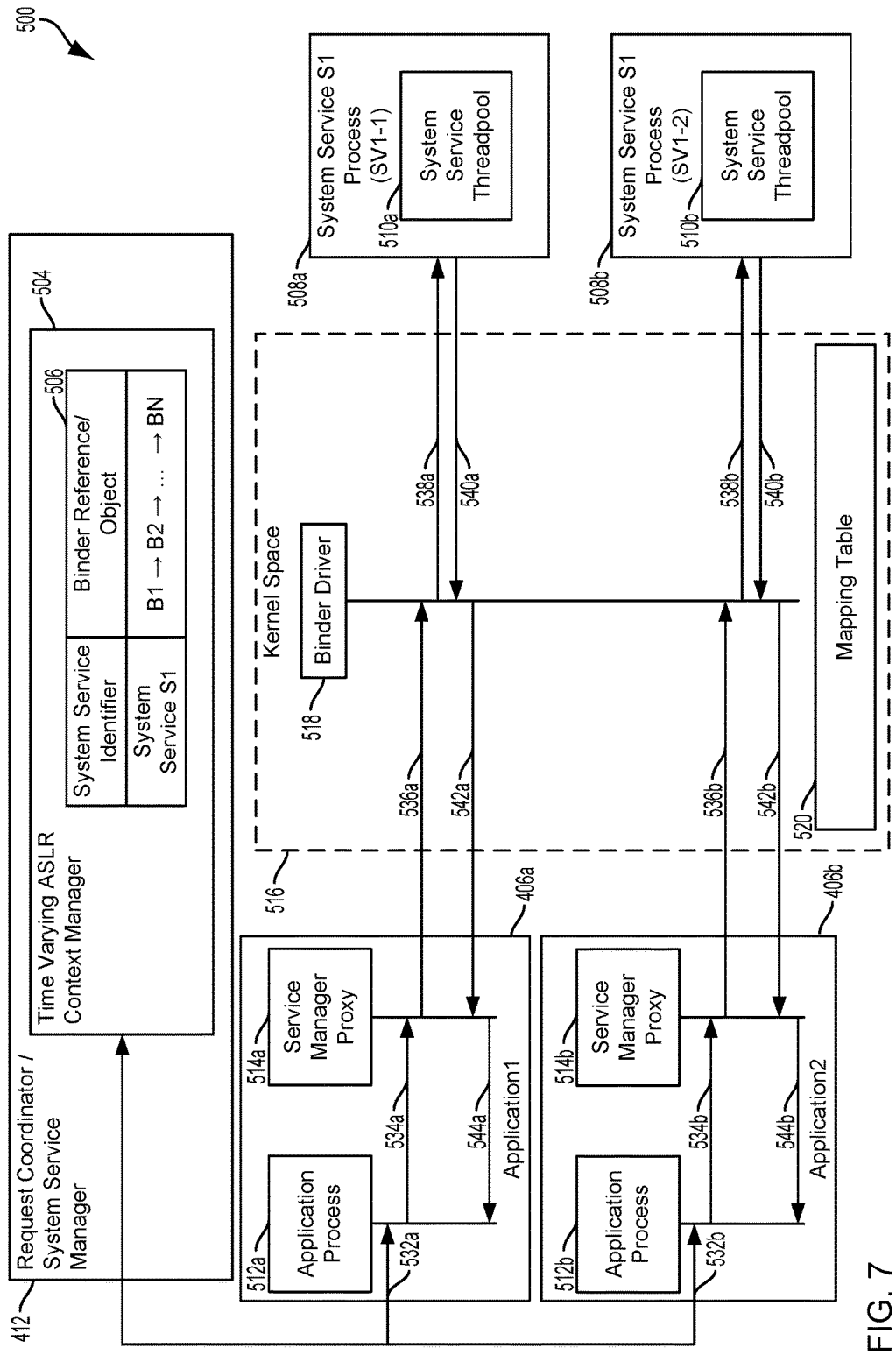
FIG. 7 is a component block and signaling diagram illustrating an example time varying address space layout randomization system suitable for implementing an embodiment of executing multiple versions version of a system service for multiple applications.

FIG. 7 illustrates an example time varying ASLR system suitable for implementing an embodiment of executing multiple versions version of a system service for multiple applications. The example shown in FIG. 7 is similar to the examples described above with reference to FIGS. 5 and 6. All of the examples share the same components, but the example illustrated in FIG. 7 includes multiple applications 406a, 406b, multiple application processes 512a, 512b, and multiple service manager proxies 514a, 514b. A first application 406a may correspond to the application 406 described with reference to FIGS. 5 and 6. A second application 406b may be any application that may call the same system service as the first application 406a. Further, the examples of FIG. 6 and FIG. 7 share the communication signals 532a, 532b, 534a, 534b, 536a, 536b, 538a, 538b, 540a, 540b, 542a, 542b, 544a, and 544b. However, in the example illustrated in FIG. 7, the communication signals 532a, 534a, 536a, 538a, 540a, 542a, and 544a may relate to the first request to execute a system service by the first application 406a, and the communication signals 532b, 534b, 536b, 538b, 540b, 542b, and 544b may relate to the second request to execute a system service by the second application 406b.

In various implementations, as with multiple requests to execute the same system service by the same application, the request coordinator 412 may be configured to avoid assigning the same version of the requested system service to successive requests to execute the system service, regardless of whether the requesting application is the same or different. Avoiding using the same version of the system service even though the request to execute the system service originates from different applications may help to obfuscate the system service from an attacker using multiple applications in an attempt to defeat ASLR.

The request coordinator 412 may receive the second request for the version of the system service 532b from a second application process 512b of the second application 406b. The time varying ASLR context manager 504 may randomly select one of the binder references correlated with the system service identifier of the requested system service in the registration table 506. The time varying ASLR context manager 504 may keep track of pervious assignments of versions of the requested system service to all applications 406a, 406b. The time varying ASLR context manager 504 may randomly select the second binder reference not previously provided to the application 406a. The request coordinator 412 may return the randomly selected second binder reference to the second application 406b.

The second application 406b may receive the randomly selected second binder reference correlated with the system service identifier of the requested system service, and use the second binder reference to call the requested system service 534b. A second service manager proxy 514b may interface with the kernel space 516 to access the version of the requested system service providing the second binder reference with a call for the version of the requested system service 536b. The binder driver 518 may receive the call for the version of the requested system service 536b, using the second binder reference to locate the virtual address of the object of the version of the requested system service correlated with the second binder reference. The binder driver 518 may communicate with the corresponding system service process 508b for the version of the requested system service to request execution of the version of the requested system service 538b using the data of the version of the requested system service from the virtual address correlated with the second binder reference.

The corresponding system service process 508b may return a result of the execution of the requested system service 540b upon completion of the execution using the data of the designated version of the system service by the system service process 508b. The binder driver 518 may forward the result 542b to the second service manager proxy 514b, which may forward the result 544b to the second application process 512b.

Figure 8:
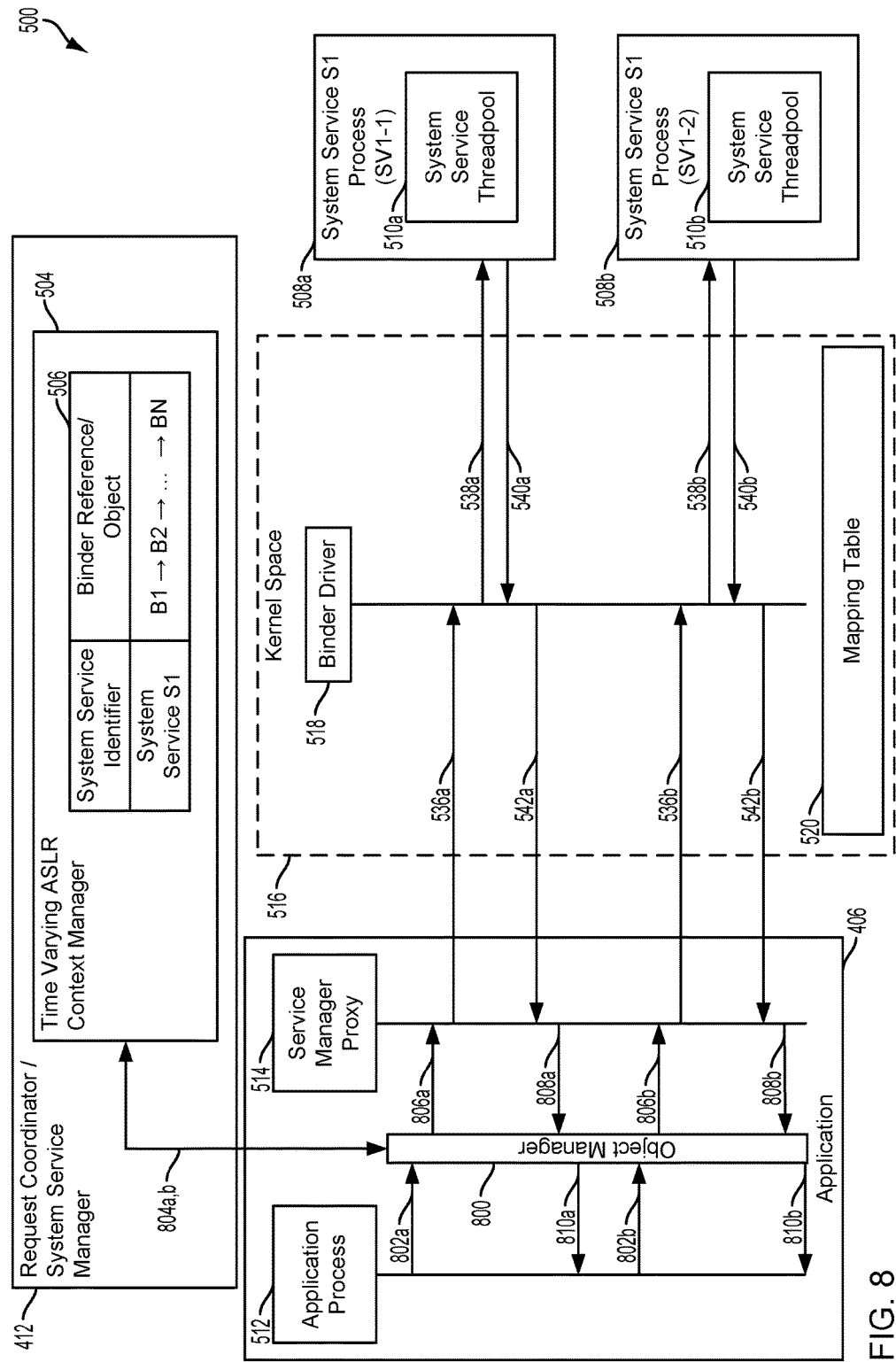
FIG. 8 is a component block and signaling diagram illustrating an example time varying address space layout randomization system with an object manager suitable for implementing an embodiment of executing multiple versions of a system service.

FIG. 8 illustrates an example time varying ASLR system with an object manager suitable for implementing an embodiment of executing multiple versions of a system service. The example shown in FIG. 8 is similar to the examples described above with reference to FIGS. 5 and 6. All of the examples share the same components, but the example in FIG. 8 includes an object manager 800 of the application 406. Further, the examples of FIG. 6 and FIG. 8 share the communication signals 536a, 536b, 538a, 538b, 540a, 540b, 542a, and 542b.

The application process 512 of the application 406 may send requests to execute a system service 802a, 802b using the system service identifier of the requested system service. The object manager 800 may receive the requests to execute the system service 802a, 802b, and send requests for versions of the system service 804a, 804b, including the system service identifier. The object manager 800 may send each request for a version of the system service 804a, 804b, individually in response to receiving one of the requests to execute the system service 802a, 802b. The request coordinator 412 may receive the requests for the versions of the system service 804a, 804b.

The time varying ASLR context manager 504 may randomly select a first binder reference correlated with the system service identifier of the requested system service in the registration table 506 in response to one of the requests for the versions of the system service 804a, 804b. As described with reference to FIG. 5, the time varying ASLR context manager 504 may keep track of pervious assignments of versions of the requested system service to the application 406, for example, a first assignment of the first binder reference for the first request to execute a system service 804a. The time varying ASLR context manager 504 may randomly select a second binder reference not previously provided to the application 406 in response to the other of the requests for the versions of the system service 804a, 804b. The request coordinator 412 may individually return the randomly selected binder references to the application 406.

The object manager 800 may receive the randomly selected binder reference, and send requests to execute the system service 806a, 806b with a respective randomly selected binder reference to the service manager proxy 514. The service manager proxy 514b may interface with the kernel space 516 to access the versions of the requested system service providing the binder references with calls for the version of the requested system service 536a, 536b.

The binder driver 518 may receive the calls for the version of the requested system service 536a, 536b, using the binder references to locate the virtual addresses of the objects of the versions of the requested system service correlated with the binder references. The binder driver 518 may communicate with the corresponding system service processes 508a, 508b for the versions of the requested system service, requesting execution of the versions of the requested system service 538a, 538b using the data of the versions of the requested system service from the virtual addresses correlated with the binder references.

The corresponding system service processes 508a, 508b may return results of the executions of the requested system service 540a, 540b upon completion of the executions using the data of the designated versions of the system service by the system service processes 508a, 508b. The binder driver 518 may forward the results 542a, 542b to the service manager proxy 514, which may forward the results 808a, 808b to the object manager 800. The object manager 800 may forward the results 810a, 810b to the application process 512.

Figure 9:
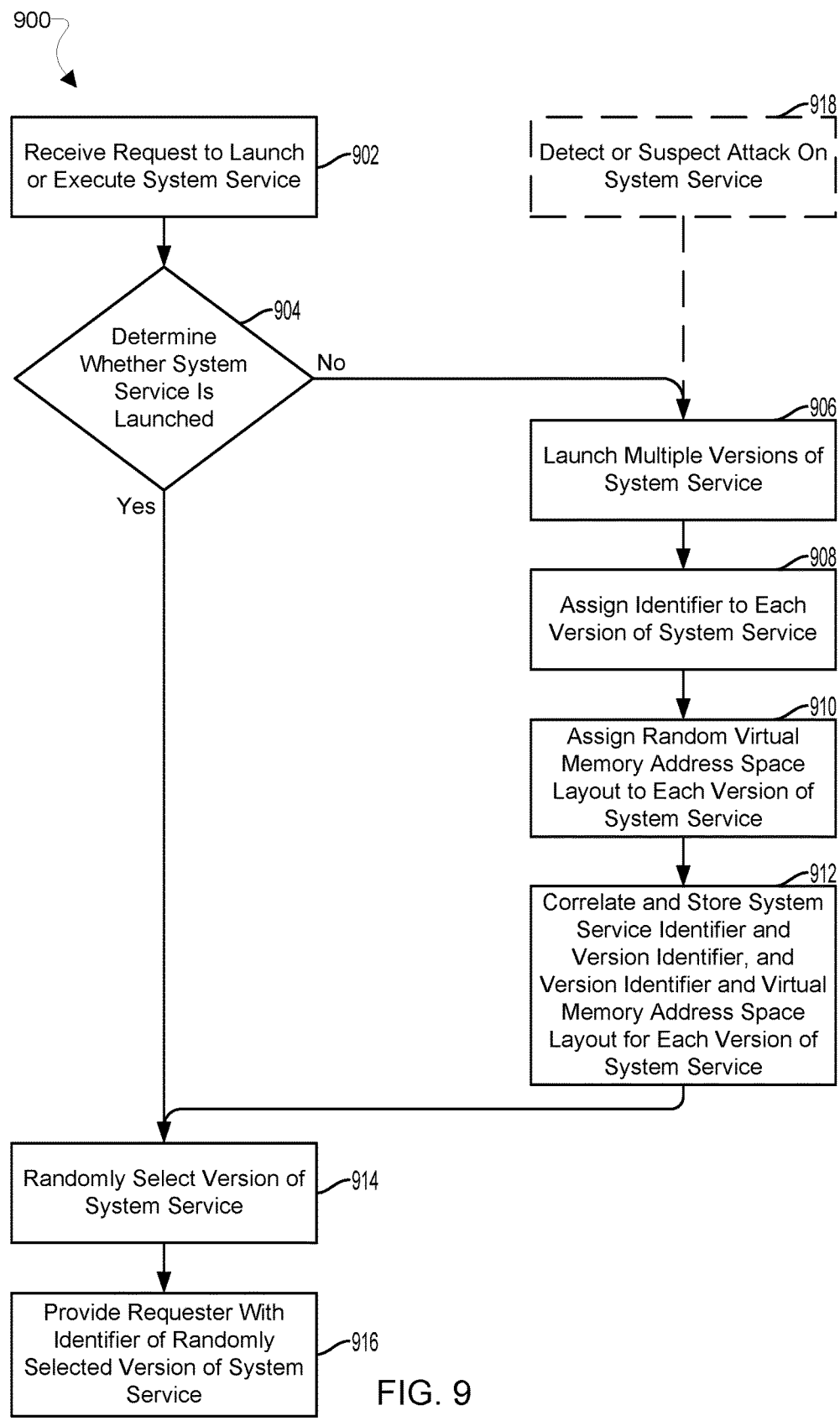
FIG. 9 is a process flow diagram illustrating a method for implementing time varying address space layout randomization according to an embodiment.

FIG. 9 illustrates a method 900 for implementing time varying ASLR according to an embodiment. The method 900 may be implemented in a computing device in software executing in a processor (e.g., the processor 14 in FIGS. 1 and 2), in general purpose hardware, in dedicated hardware, or in a combination of a processor and dedicated hardware, such as a processor executing software within a time varying ASLR system that includes other individual components. In order to encompass the alternative configurations enabled in the various embodiments, the hardware implementing the method 900 is referred to herein as a "computing device."

In block 902, the computing device may receive a request to launch or execute a system service. The request to launch or execute the system service may include a system service identifier of the system service.

The request to launch the system service received in block 902 may originate from a boot process executed by the computing device. The request to launch the system service may be for launching the system service so that the service will be available for later execution in response to a request to execute the system service. In other words, the request to launch the system service may prompt the computing device to launch the system service without executing the system service.

The request to execute the system service received in block 902 may also originate from an application executed by the computing device. Such a request to execute the system service may prompt the computing device to launch the system service if the system service is not launched at the time of the request.

In determination block 904, the computing device may determine whether the requested system service is already launched. In some implementations, the computing device may check records (e.g., in the registration table 506 described with reference to FIGS. 5-8) to determine whether a record exists having the system service identifier, a system service version identifier, a binder reference, or an object of a version of the system service correlated with the system service identifier.

In some implementations, at any time during operations of the computing device, the computing device may detect an attack or suspect an attack on any system service in optional block 918. In various implementations, the computing device may detect or suspect an attack on a system service by recognizing unusual access or request patterns and requesters for the system service.

In response to detecting or suspecting an attack on a system service in block 918, or in response to determining that the requested system service is not already launched (i.e., determination block 904="No"), the computing device may launch multiple versions of the system service in block 906. The computing device may launch any number of versions of the system service. In various implementations, the number of versions of any system service that are launched may be the same as or vary from a number of versions of another system service. The number of versions of a system service launched may be preprogrammed or depend on a number of factors, including expected or measure use of the system service, a priority or vulnerability of the system service, state of the computing device (including memory space and power availability), and detection or suspicion of an attack on the system service.

In block 908, the computing device may assign a system service version identifier, a binder reference, or an object to each version of the system service. The system service version identifier, the binder reference, or the object may function to uniquely identify the version of the system service.

In block 910, the computing device may assign a random virtual memory address space layout to each version of the system service. The random virtual memory address space layout of each version of the system service may be mapped to physical memory locations where data for executing the version of the system service is stored. The data may include stacks, heaps, data, executables, function pointers or library memory maps, etc. In some implementations, the random virtual memory address space layout of each version of the system service may also be mapped to a physical memory location of the code for executing the system service. In some implementations, the data may include pointers to the physical memory location of the code for executing the system service. An example method 1000 for assigning a random virtual memory address space layout to each version of the system service in block 910 is described with reference to FIG. 10.

In block 912, the computing device may correlate and store the system service identifier, the system service version identifier, the binder reference, or the object of each version of the system service, and the random virtual memory address of each version of the system service. In some implementations, the assignment of the system service version identifier, the binder reference, or the object of the version of the system service may be recorded by the computing device in a manner that correlates the system service version identifier, the binder reference, or the object of the version of the system service with the identifier of the system service. For example, the records of the correlations may be part of the registration table 506 described with reference to FIGS. 5-8. In some implementations, the assignment of the random virtual memory address to the version of the system service may be recorded by the computing device in a manner that correlates the system service version identifier, a binder reference, or the object of the version of the system service with the random virtual memory address. For example, the records of the correlations may be part of the mapping table 520 described with reference to FIGS. 5-8.

After correlating and storing all of the relationships of the system service, the versions of the system service, and the random virtual addresses of the versions of the system service in block 912, or in response to determining that the requested system service is already launched (i.e., determination block 904="Yes"), the computing device may randomly select a version of the system service in block 914. Random selection may be implemented using a pseudorandom algorithm.

In some implementations, the random selection in block 914 may be executed multiple times in response to selection of a same version of the system service a certain number of times within a time period or a threshold number of requests for the system service, either by various or a single application.

In some implementations, the random selection in block 914 may include a selection from a set of versions of the system service excluding versions of the system service that are currently being used or have recently been used. Recent use may be determined by use of the version of the system service within a time period or use of the version of the system service within a threshold number of requests for the system service, either by various or a single application.

In block 916, the computing device may provide the requester with the system service version identifier, the binder reference, or the object of the randomly selected version of the system service.

Figure 10:
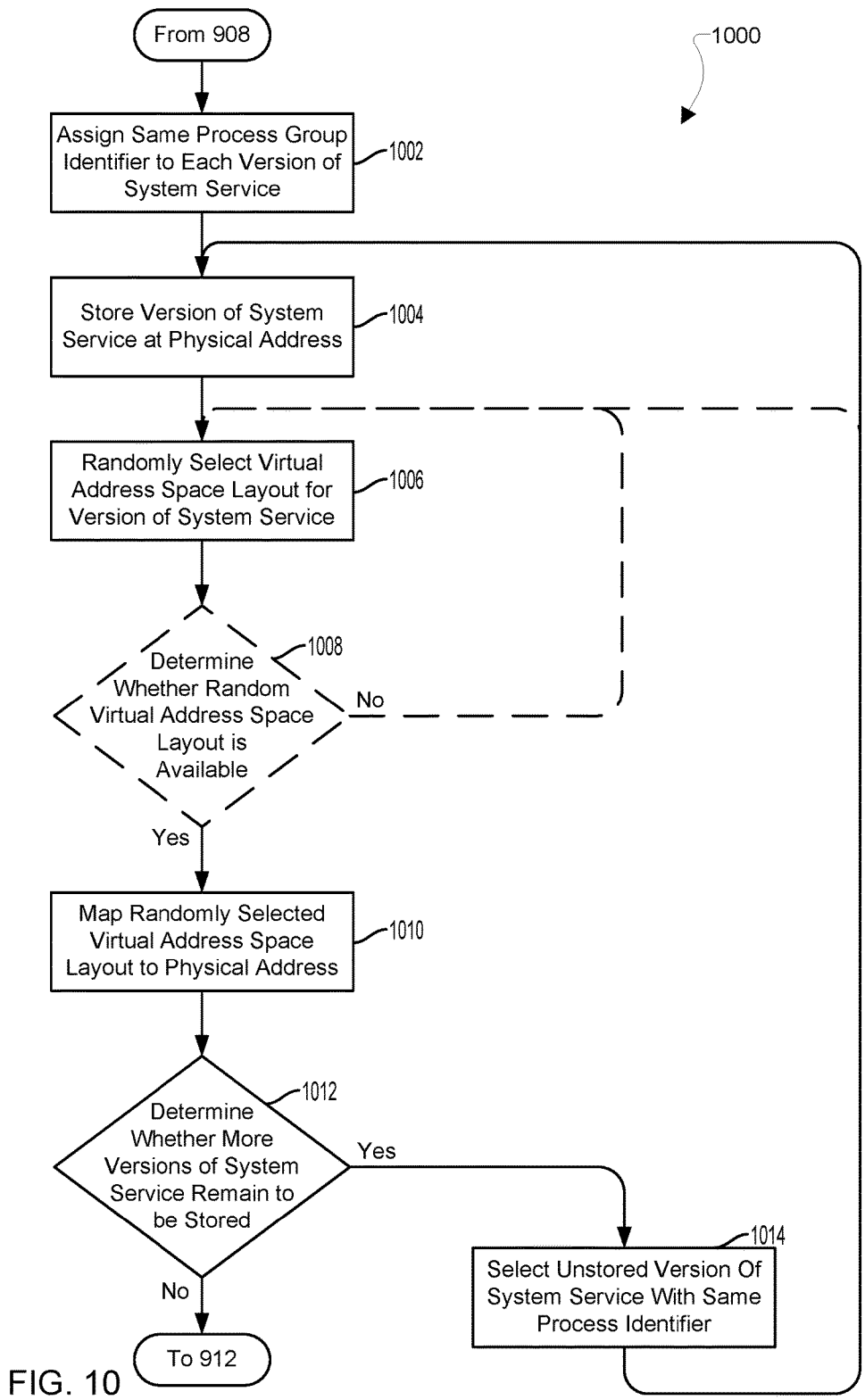
FIG. 10 is a process flow diagram illustrating a method for implementing random assignment of virtual memory address space layout to versions of a system service in time varying address space layout randomization according to an embodiment.

FIG. 10 illustrates an example method 1000 for implementing random assignment of virtual memory address space layout to versions of a system service in time varying ASLR according to an embodiment. The method 1000 may be implemented in a computing device in software executing in a processor (e.g., the processor 14 in FIGS. 1 and 2), in general purpose hardware, in dedicated hardware, or in a combination of a processor and dedicated hardware, such as a processor executing software within a time varying ASLR system that includes other individual components. In order to encompass the alternative configurations enabled in the various embodiments, the hardware implementing the method 1000 is referred to herein as a "computing device."

In block 1002, the computing device may assign a same process group identifier (ID) to each version of the system service.

In block 1004, the computing device may store a version of the system service at a location (a physical address) in the physical memory. In some implementations, certain memory devices, or partitions of memory devices may be designated for storing the versions of the system services. The computing device may store a version of a system service in an unused location in the physical memory, or in a used location in a physical memory by overwriting the current data stored in the location in the physical memory according to various memory replacement policies.

In block 1006, the computing device may randomly select a virtual address space layout for the version of the system service. In some implementations, the computing device may implement a pseudorandom selection algorithm for selecting a virtual address space layout. In some implementations, virtual addresses used for other purposes (e.g., virtual addresses of virtual address space layouts assigned to other versions of the same or other system services) may be excluded from a set of virtual addresses used to randomly select the virtual address space layout for version of the system service.

In optional determination block 1008, the computing device may determine whether the randomly selected virtual address space layout is available. In some implementations, the computing device may compare the randomly selected virtual address space layout with other used virtual addresses to determine whether the randomly selected virtual address space layout is already in use for another purpose.

In response to determining that the randomly selected virtual address space layout is unavailable (i.e., optional determination block 1008="No"), the computing device may randomly select a virtual address space layout for the version of the system service in block 1006.

In response to determining that the randomly selected virtual address space layout is available (i.e., optional determination block 1008="Yes"), the computing device may map the randomly selected virtual address space layout for the version of the system service to the physical address where the version of the system service is stored in block 1010.

In determination block 1012, the computing device may determine whether more versions of the system service remain to be stored in the physical memory and assigned a random virtual address space layout. The computing device may use the process group identifier common to the versions of the same system service to determine whether more versions of the system service remain. When a version with the same process group identifier remains in a queue for storing and assignment of a random virtual address space layout, the computing device may recognize that there are versions of the system service remaining.

In response to determining that more versions of the system service remain to be stored in the physical memory and assigned a random virtual address space layout (i.e., determination block 1012="Yes"), the computing device may selected an unstored version of the system service with the same processor identifier in block 1014, store the version of the system service at a location in the physical memory in block 1004, and randomly select a virtual address space layout for the version of the system service in block 1006 as described.

In some implementations, all of the versions of the computing system service may already be stored in memory. So, in response to determining that no more versions of the system service remain to be stored in the physical memory and assigned a random virtual address space layout (i.e., determination block 1012="No"), the computing device may correlate and store the system service identifier, the system service version identifier, the binder reference, or the object of each version of the system service, and the random virtual memory address space layout of each version of the system service in block 912 of the method 900 as described with reference to FIG. 9. In various embodiments, the operations in block 912 may be executed regardless of the outcome of determination block 1012, and may be executed concurrently with the operations of various blocks 1002-1014 of the method 1000.

Figure 11:
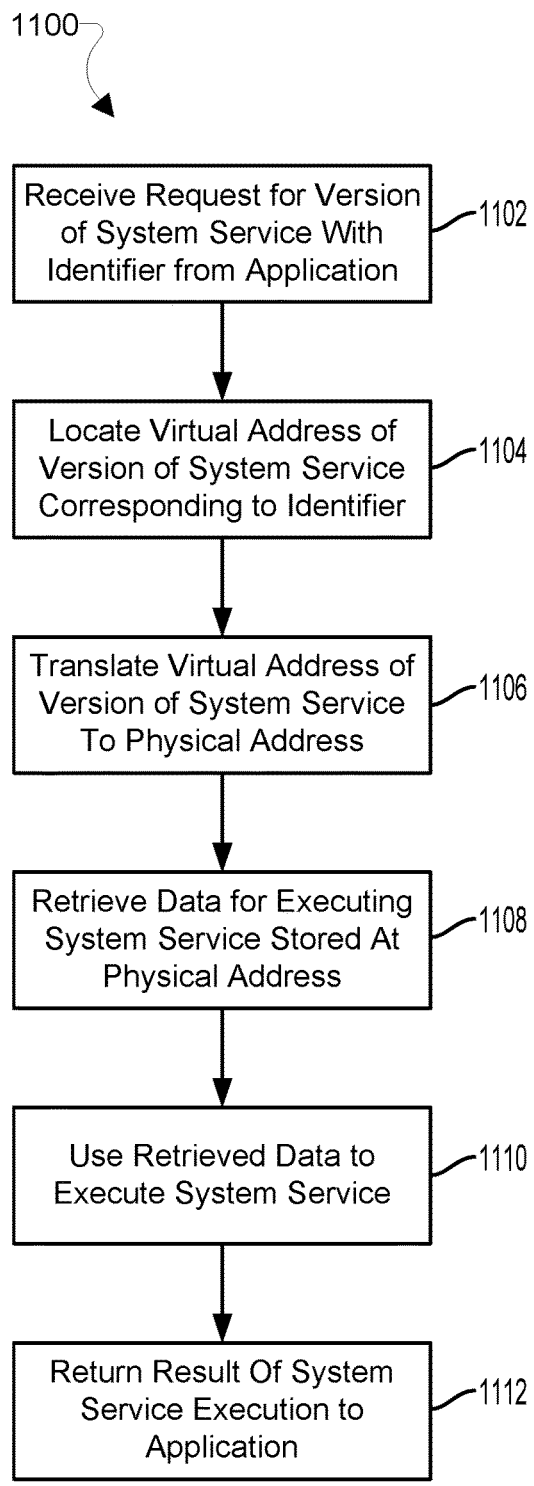
FIG. 11 is a process flow diagram illustrating a method for implementing system service execution using time varying address space layout randomization according to an embodiment.

FIG. 11 illustrates a method 1100 for implementing system service execution using time varying ASLR according to an embodiment. The method 1100 may be implemented in a computing device in software executing in a processor (e.g., the processor 14 in FIGS. 1 and 2), in general purpose hardware, in dedicated hardware, or in a combination of a processor and dedicated hardware, such as a processor executing software within a time varying ASLR system that includes other individual components. In order to encompass the alternative configurations enabled in the various embodiments, the hardware implementing the method 1100 is referred to herein as a "computing device."

The method 1100 may be a continuation of an implementation of the method 900 described with reference to FIG. 9, in which the requester of the system service is the application. In block 1102, the computing device may receive a request for a version of the system service from the application, including the system service version identifier, the binder reference, or the object for the version of the system service.

In block 1104, the computing device may locate a virtual address of the version of the system service, such as a starting virtual address of the randomly selected virtual address space layout of the version of the system service. In various implementations, the computing device may use the system service version identifier, the binder reference, or the object of the version of the system service to find a record correlating the system service version identifier, the binder reference, or the object of the system service with the virtual address. For example, the computing device may search records of the mapping table 520 described with reference to FIGS. 5-8.

In block 1106, the computing device may translate the virtual address of the version of the system service to the physical address of the location in the physical memory where the data of the version of the system service is stored. In this operation, the computing device may use the virtual address to physical address mapping generated for the version of the system service in block 1010 as described herein with reference to FIG. 10.

In block 1108, the computing device may retrieve the data of the version of the system service used for execution from the physical address.

In block 1110, the computing device may use the retrieved data to execute the system service. The computing device may use the data to provide variables, conditions, and code injections or replacements for executing the system service.

In block 1112, the computing device may return a result of the execution of the system service to the application.

Figure 12:
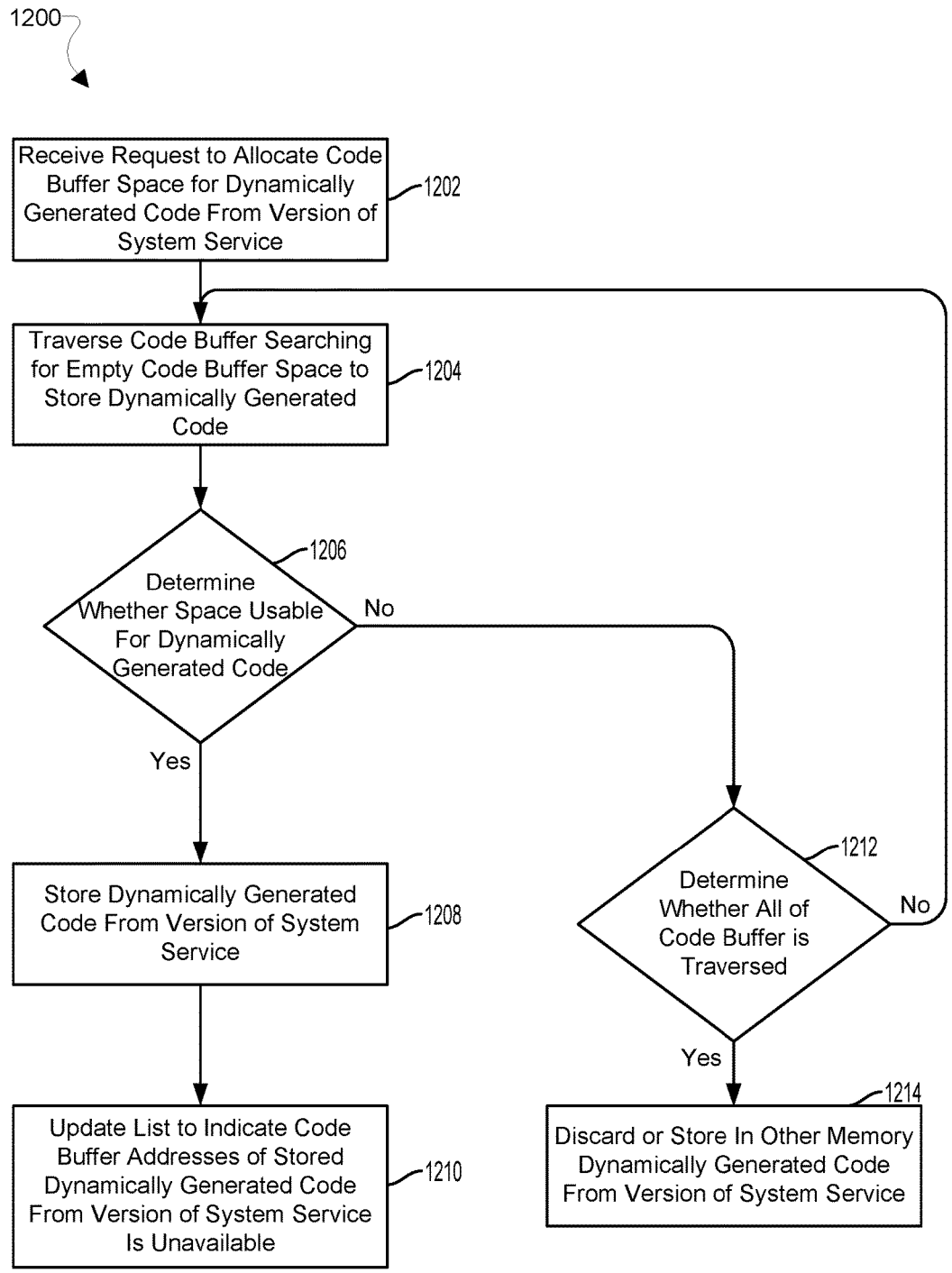
FIG. 12 is a process flow diagram illustrating a method for implementing system service execution using time varying address space layout randomization with dynamic code generation according to an embodiment.

FIG. 12 illustrates a method 1200 for implementing system service execution using time varying ASLR with dynamic code generation according to an embodiment. The method 1200 may be implemented in a computing device in software executing in a processor (e.g., the processor 14 in FIGS. 1 and 2), in general purpose hardware, in dedicated hardware, or in a combination of a processor and dedicated hardware, such as a processor executing software within a time varying ASLR system that includes other individual components. In order to encompass the alternative configurations enabled in the various embodiments, the hardware implementing the method 1200 is referred to herein as a "computing device."

In various implementations, prior executions of a system service may result in dynamically generated code that may be used in subsequent executions of the system service and may improve the execution efficiency of the system service. In block 1202, the computing device may receive a request to allocate code buffer space for dynamically generated code from a version of the system service. Different versions of the system service may generate different dynamically generated code that may be used in subsequent executions of the version of the system service.

In block 1204, the computing device may traverse the code buffer searching for empty code buffer space for storing the dynamically generated code. In various implementations, the computing device may traverse the code buffer using various algorithms and patterns, including randomly selecting addresses of the code buffer. The computing device may select an address of the code buffer to check whether the address is associated with a code buffer space that is available and large enough to store the dynamically generated code. A code buffer space large enough to store the dynamically generated code may be any code buffer space at least the size of the dynamically generated code and including the selected address.

In determination block 1206, the computing device may determine whether code buffer space associated with the selected code buffer address is usable for the dynamically generated code from the version of the system service. In various implementations, determining whether the identified code buffer space is usable, may include determining whether the code buffer space is available and large enough for storing the dynamically generated code. The computing device may determine whether the code buffer space is available and large enough by comparing the code buffer space to a list, or other data structure configured to link one data with another data, correlating the system service version identifiers, the binder references, or the objects of the versions of the system services with code buffer memory addresses. For example, the computing device may compare the code buffer space to records of a list 422 as described with reference to FIG. 4B. A code buffer space that is available and large enough may be one for which no addresses of the code buffer space conflict with code buffer addresses in the list correlated with other dynamically generated code.

In response to determining that the code buffer space associated with the selected code buffer address is usable for the dynamically generated code from the version of the system service (i.e., determination block 1206="Yes"), the computing device may store the dynamically generated code from the version of the system service in the code buffer at the identified code buffer address in block 1208.

In block 1210, the computing device may update the list, or other data structure configured to link one data with another data, to indicate the code buffer addresses of the stored dynamically generated code from the version of the system service is unavailable or used.

In response to determining that the code buffer space correlated with the version of the system service is not usable for the dynamically generated code from the version of the system service (i.e., determination block 1206="No"), the computing device may determine whether the code buffer is traversed in determination block 1212. In various embodiments, to traverse the code buffer, the computing device may check every code buffer address for code buffer space that is available and large enough to store the dynamically generated code. In various embodiments, to traverse the code buffer, the computing device may check enough of the code buffer addresses that the remaining code buffer addresses cannot be correlated with code buffer spaces with enough space to store the dynamically generated code.

In response to determining that the code buffer is not traversed (i.e., determination block 1212="No"), the computing device may continue traversing the code buffer searching for empty code buffer space for storing the dynamically generated code in block 1204.

In response to determining that the code buffer is traversed (i.e., determination block 1212="Yes"), the computing device may discard, or store in other memory, the dynamically generated code from the version of the system service in block 1214.

Figure 13:
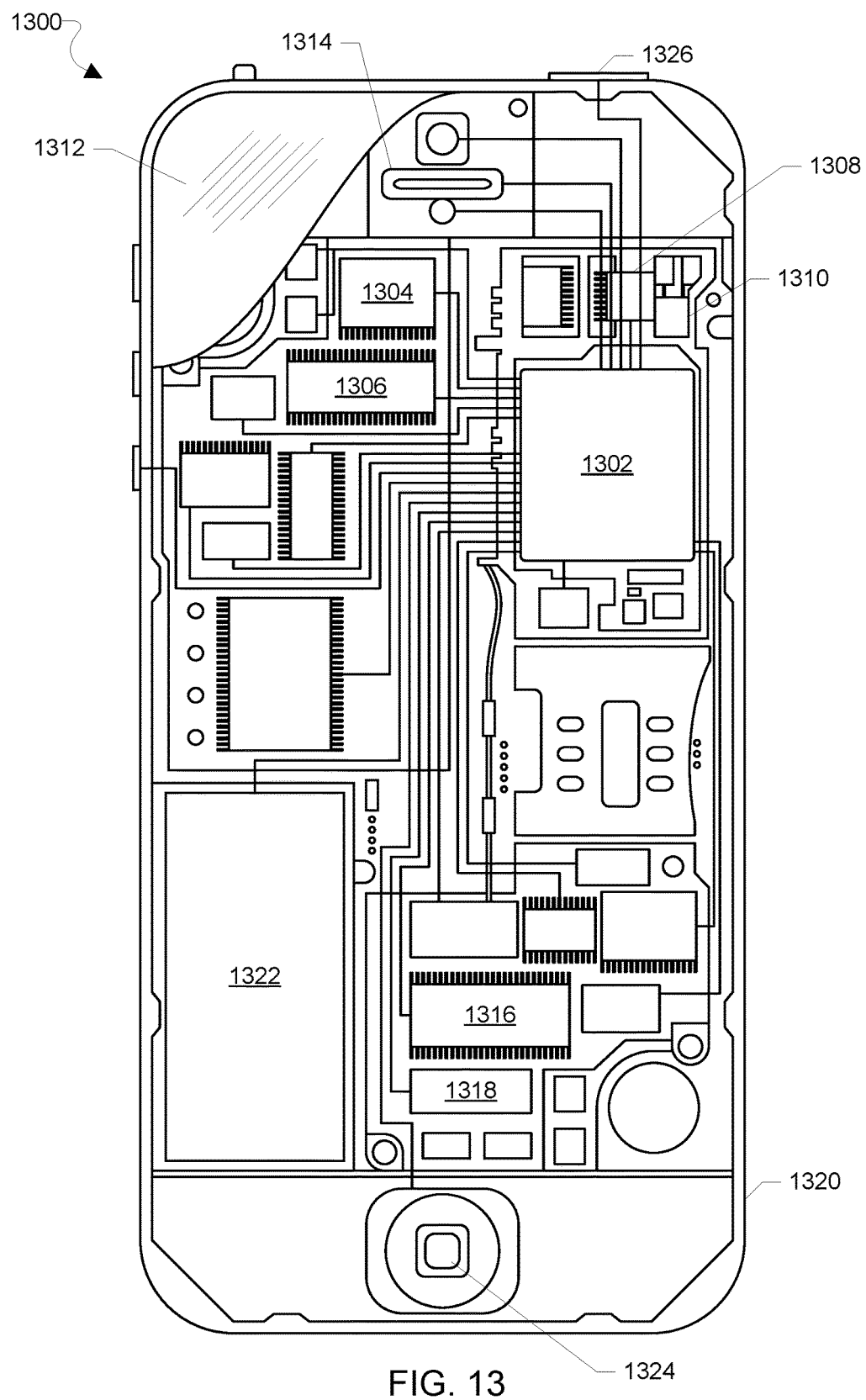
FIG. 13 is component block diagram illustrating an example mobile computing device suitable for use with the various embodiments.

The various embodiments (including, but not limited to, embodiments described above with reference to FIGS. 1-12) may be implemented in a wide variety of computing systems including mobile computing devices, an example of which suitable for use with the various embodiments is illustrated in FIG. 13. The mobile computing device 1300 may include a processor 1302 coupled to a touchscreen controller 1304 and an internal memory 1306. The processor 1302 may be one or more multicore integrated circuits designated for general or specific processing tasks. The internal memory 1306 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1304 and the processor 1302 may also be coupled to a touchscreen panel 1312, such as a resistive-sensing touchscreen, capacitive-sensing touchscreen, infrared sensing touchscreen, etc. Additionally, the display of the computing device 1300 need not have touch screen capability.

The mobile computing device 1300 may have one or more radio signal transceivers 1308 (e.g., Peanut, Bluetooth, Zigbee, Wi-Fi, RF radio) and antennae 1310, for sending and receiving communications, coupled to each other and/or to the processor 1302. The transceivers 1308 and antennae 1310 may be used with the above-mentioned circuitry to implement the various wireless transmission protocol stacks and interfaces. The mobile computing device 1300 may include a cellular network wireless modem chip 1316 that enables communication via a cellular network and is coupled to the processor.

The mobile computing device 1300 may include a peripheral device connection interface 1318 coupled to the processor 1302. The peripheral device connection interface 1318 may be singularly configured to accept one type of connection, or may be configured to accept various types of physical and communication connections, common or proprietary, such as Universal Serial Bus (USB), FireWire, Thunderbolt, or PCIe. The peripheral device connection interface 1318 may also be coupled to a similarly configured peripheral device connection port (not shown).

The mobile computing device 1300 may also include speakers 1314 for providing audio outputs. The mobile computing device 1300 may also include a housing 1320, constructed of a plastic, metal, or a combination of materials, for containing all or some of the components described herein. The mobile computing device 1300 may include a power source 1322 coupled to the processor 1302, such as a disposable or rechargeable battery. The rechargeable battery may also be coupled to the peripheral device connection port to receive a charging current from a source external to the mobile computing device 1300. The mobile computing device 1300 may also include a physical button 1324 for receiving user inputs. The mobile computing device 1300 may also include a power button 1326 for turning the mobile computing device 1300 on and off.

Figure 14:
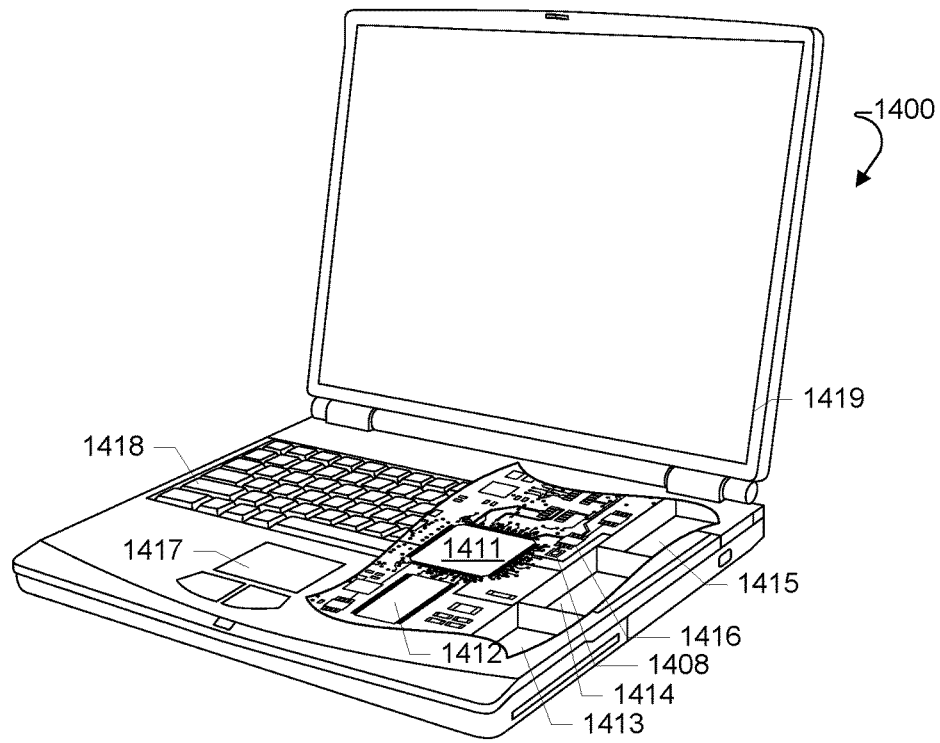
FIG. 14 is component block diagram illustrating an example mobile computing device suitable for use with the various embodiments.

The various embodiments (including, but not limited to, embodiments described above with reference to FIGS. 1-12) may be implemented in a wide variety of computing systems include a laptop computer 1400 an example of which is illustrated in FIG. 14. Many laptop computers include a touchpad touch surface 1417 that serves as the computer's pointing device, and thus may receive drag, scroll, and flick gestures similar to those implemented on computing devices equipped with a touch screen display and described above. A laptop computer 1400 will typically include a processor 1411 coupled to volatile memory 1412 and a large capacity nonvolatile memory, such as a disk drive 1413 of Flash memory. Additionally, the computer 1400 may have one or more antenna 1408 for sending and receiving electromagnetic radiation that may be connected to a wireless data link and/or cellular telephone transceiver 1416 coupled to the processor 1411. The computer 1400 may also include a floppy disc drive 1414 and a compact disc (CD) drive 1415 coupled to the processor 1411. In a notebook configuration, the computer housing includes the touchpad 1417, the keyboard 1418, and the display 1419 all coupled to the processor 1411. Other configurations of the computing device may include a computer mouse or trackball coupled to the processor (e.g., via a USB input) as are well known, which may also be used in conjunction with the various embodiments.

Figure 15:
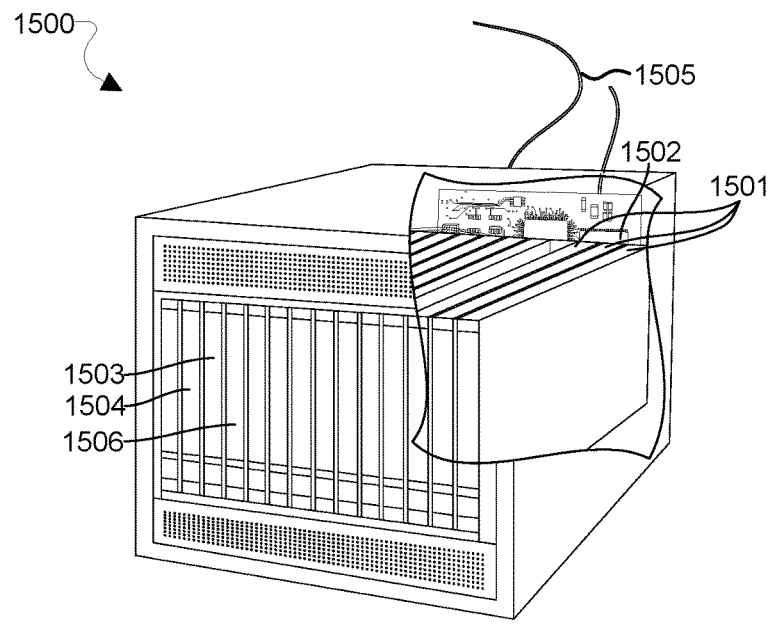
FIG. 15 is component block diagram illustrating an example server suitable for use with the various embodiments.

The various embodiments (including, but not limited to, embodiments described above with reference to FIGS. 1-12) may also be implemented in fixed computing systems, such as any of a variety of commercially available servers. An example server 1500 is illustrated in FIG. 15. Such a server 1500 typically includes one or more multi-core processor assemblies 1501 coupled to volatile memory 1502 and a large capacity nonvolatile memory, such as a disk drive 1504. As illustrated in FIG. 15, multi-core processor assemblies 1501 may be added to the server 1500 by inserting them into the racks of the assembly. The server 1500 may also include a floppy disc drive, compact disc (CD) or digital versatile disc (DVD) disc drive 1506 coupled to the processor 1501. The server 1500 may also include network access ports 1503 coupled to the multi-core processor assemblies 1501 for establishing network interface connections with a network 1505, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method of time varying address space layout randomization on a computing device, comprising:
    launching a first plurality of versions of a system service;
    assigning a random virtual address space layout to each of the first plurality of versions of the system service;
    receiving a first request to execute the system service from a first application;
    randomly selecting a first version of the system service from the first plurality of versions of the system service; and
    executing the system service using data of the first version of the system service.

2. The method of claim 1, further comprising:
    receiving a second request to execute the system service from the first application;
    randomly selecting a second version of the system service from the first plurality of versions of the system service; and
    executing the system service using data of the second version of the system service.

3. The method of claim 1, further comprising:
    assigning a system service version identifier to each of the first plurality of versions of the system service, wherein the system service version identifier of each of the first plurality of versions of the system service is different;
    correlating the system service version identifier of each of the first plurality of versions of the system service to a system service identifier of the system service;
    storing the correlations of the system service version identifier of each of the first plurality of versions of the system service and the system service identifier;
    correlating the system service version identifier of each of the first plurality of versions of the system service with a corresponding one of the random virtual address space layout of each of the first plurality of versions of the system service; and
    storing the correlations of the system service version identifier of each of the first plurality of versions of the system service with a corresponding one of the random virtual address space layout of each of the first plurality of versions of the system service.

4. The method of claim 3, wherein:
    the first request to execute the system service includes the system service identifier;
    randomly selecting a first version of the system service from the first plurality of versions of the system service comprises randomly selecting the first version of the system service from the first plurality of versions of the system service correlated with the system service identifier;
    the method further comprising:
        providing the first application with a first system service version identifier of the first version of the system service; and
        receiving a request to execute the first version of the system service having the first system service version identifier from the first application.

5. The method of claim 4, further comprising:
    locating a random virtual address of the first system service version using a correlation between the first system service version identifier and the random virtual address space layout of the first system service version;
    translating the random virtual address of the first system service version to a physical address at which the data of the first version of the system service is stored; and
    retrieving the data of the first version of the system service.

6. The method of claim 3, further comprising assigning a process identifier to each of the first plurality of versions of the system service,
    wherein the process identifier for each of the first plurality of versions of the system service is the same, and
    wherein assigning a random virtual address space layout to each of the first plurality of versions of the system service, assigning a system service version identifier to each of the first plurality of versions of the system service, and correlating the system service version identifier of each of the first plurality of versions of the system service to a system service identifier of the system service occurs for each of the first plurality of versions of the system service assigned the process identifier.

7. The method of claim 1, further comprising:
    receiving a request to allocate code buffer space for dynamically generated code of an execution of the first version of the system service;
    randomly selecting a code buffer address;
    determining whether a code buffer space correlated with the code buffer address is large enough and available to store the dynamically generated code; and
    storing the dynamically generated code at the code buffer address in response to determining that the code buffer space is large enough to store the dynamically generated code.

8. The method of claim 1, further comprising:
    receiving a second request to execute the system service from a second application;
    detecting the second request to execute the system service from the second application is an attack on the system service;

launching a second plurality of versions of the system service;
assigning a random virtual address space layout to each of the second plurality of versions of the system service, wherein the random virtual address space layout of each of the first plurality of versions of the system service and the random virtual address space layout of each of the second plurality of versions of the system service are different;
randomly selecting a second version of the system service from the first plurality of versions of the system service and the second plurality of versions of the system service; and
executing the system service using data of the second version of the system service.

9. The method of claim 1, wherein:
launching a first plurality of versions of a system service comprises launching each of multiple versions of the system service of the first plurality of versions of the system service on one of a plurality of heterogeneous processor cores having different instruction set architectures;
randomly selecting a first version of the system service from the first plurality of versions of the system service comprises randomly selecting a first heterogeneous processor core of the plurality of heterogeneous processor cores on which the first version of the system service is launched;
executing the system service using data of the first version of the system service comprises executing the system service by the first heterogeneous processor core; and
the method further comprises:
  transferring the first request to execute the system service from the first application to the first heterogeneous processor core;
  receiving an output of the execution of the system service by the first heterogeneous processor core; and
  returning the output to the first application.

10. A computing device, comprising:
a launcher configured to perform operations comprising launching a first plurality of versions of a system service;
a mapper communicatively connected to the launcher and configured to perform operations comprising assigning a random virtual address space layout to each of the first plurality of versions of the system service;
a request coordinator communicatively connected to the launcher and configured to perform operations comprising:
  receiving a first request to execute the system service from a first application;
  randomly selecting a first version of the system service from the first plurality of versions of the system service; and
a processor communicatively connected to the request coordinator and configured with executable instructions to perform operations comprising executing the system service using data of the first version of the system service.

11. The computing device of claim 10, wherein:
the request coordinator is configured to perform operations further comprising:
  receiving a second request to execute the system service from the first application; and
  randomly selecting a second version of the system service from the first plurality of versions of the system service; and
the processor is configured with executable instructions to perform operations further comprising executing the system service using data of the second version of the system service.

12. The computing device of claim 10, wherein:
the launcher is configured to perform operations further comprising assigning a system service version identifier to each of the first plurality of versions of the system service, wherein the system service version identifier of each of the first plurality of versions of the system service is different;
the request coordinator is configured to perform operations further comprising:
  correlating the system service version identifier of each of the first plurality of versions of the system service to a system service identifier of the system service; and
  storing the correlations of the system service version identifier of each of the first plurality of versions of the system service and the system service identifier; and
the processor is configured with executable instructions to perform operations further comprising:
  correlating the system service version identifier of each of the first plurality of versions of the system service with a corresponding one of the random virtual address space layout of each of the first plurality of versions of the system service; and
  storing the correlations of the system service version identifier of each of the first plurality of versions of the system service with a corresponding one of the random virtual address space layout of each of the first plurality of versions of the system service.

13. The computing device of claim 12, wherein:
the request coordinator is configured to perform operations such that:
  receiving the first request to execute the system service from the first application comprises receiving the system service identifier;
  randomly selecting a first version of the system service from the first plurality of versions of the system service comprises randomly selecting the first version of the system service from the first plurality of versions of the system service correlated with the system service identifier; and
the processor is configured with executable instructions to perform operations further comprising:
  providing the first application with a first system service version identifier of the first version of the system service; and
  receiving a request to execute the first version of the system service having the first system service version identifier from the first application.

14. The computing device of claim 13, wherein the processor is configured with executable instructions to perform operations further comprising:
  locating a random virtual address of the first system service version using a correlation between the first system service version identifier and the random virtual address space layout of the first system service version;
  translating the random virtual address of the first system service version to a physical address at which the data of the first version of the system service is stored; and retrieving the data of the first version of the system service.

15. The computing device of claim 12, wherein:
the launcher is configured to perform operations further comprising assigning a process identifier to each of the first plurality of versions of the system service, wherein the process identifier for each of the first plurality of versions of the system service is the same;
the mapper is configured to perform operations such that assigning a random virtual address space layout to each of the first plurality of versions of the system service occurs for each of the first plurality of versions of the system service assigned the process identifier;
the launcher is configured to perform operations such that assigning a system service version identifier to each of the first plurality of versions of the system service occurs for each of the first plurality of versions of the system service assigned the process identifier; and
the processor is configured with executable instructions to perform operations such that correlating the system service version identifier of each of the first plurality of versions of the system service to a system service identifier of the system service occurs for each of the first plurality of versions of the system service assigned the process identifier.

16. The computing device of claim 10, further comprising a memory allocator communicatively connected to the request coordinator and configured to perform operations comprising:
receiving a request to allocate code buffer space for dynamically generated code of an execution of the first version of the system service;
randomly selecting a code buffer address;
determining whether a code buffer space correlated with the code buffer address is large enough and available to store the dynamically generated code; and
storing the dynamically generated code at the code buffer address in response to determining that the code buffer space is large enough to store the dynamically generated code.

17. The computing device of claim 10, wherein:
the request coordinator is configured to perform operations further comprising:
receiving a second request to execute the system service from a second application;
detecting the second request to execute the system service from the second application is an attack on the system service;
the launcher is configured to perform operations further comprising launching a second plurality of versions of the system service;
the mapper is configured to perform operations further comprising assigning a random virtual address space layout to each of the second plurality of versions of the system service, wherein the random virtual address space layout of each of the first plurality of versions of the system service and the random virtual address space layout of each of the second plurality of versions of the system service are different;
the request coordinator is configured to perform operations further comprising randomly selecting a second version of the system service from the first plurality of versions of the system service and the second plurality of versions of the system service; and the processor is configured with executable instructions to perform operations further comprising executing the system service using data of the second version of the system service.

18. The computing device of claim 10, wherein:
the launcher is configured to perform operations such that launching a first plurality of versions of a system service comprises launching each of multiple versions of the system service of the first plurality of versions of the system service on one of a plurality of heterogeneous processor cores having different instruction set architectures;
the request coordinator is configured to perform operations such that randomly selecting a first version of the system service from the first plurality of versions of the system service comprises randomly selecting a first heterogeneous processor core of the plurality of heterogeneous processor cores on which the first version of the system service is launched;
the processor is the first heterogeneous processor core and is configured with executable instructions to perform operations such that executing the system service using data of the first version of the system service comprises executing the system service by the first heterogeneous processor core; and
the request coordinator is configured to perform operations further comprising:
transferring the first request to execute the system service from the first application to the first heterogeneous processor core;
receiving an output of the execution of the system service by the first heterogeneous processor core; and
returning the output to the first application.

19. A computing device, comprising:
means for launching a first plurality of versions of a system service;
means for assigning a random virtual address space layout to each of the first plurality of versions of the system service;
means for receiving a first request to execute the system service from a first application;
means for randomly selecting a first version of the system service from the first plurality of versions of the system service; and
means for executing the system service using data of the first version of the system service.

20. The computing device of claim 19, further comprising:
means for receiving a second request to execute the system service from the first application;
means for randomly selecting a second version of the system service from the first plurality of versions of the system service; and
means for executing the system service using data of the second version of the system service.

21. The computing device of claim 19, further comprising:
means for assigning a system service version identifier to each of the first plurality of versions of the system service, wherein the system service version identifier of each of the first plurality of versions of the system service is different;
means for correlating the system service version identifier of each of the first plurality of versions of the system service to a system service identifier of the system service;

means for storing the correlations of the system service version identifier of each of the first plurality of versions of the system service and the system service identifier;
means for correlating the system service version identifier of each of the first plurality of versions of the system service with a corresponding one of the random virtual address space layout of each of the first plurality of versions of the system service; and
means for storing the correlations of the system service version identifier of each of the first plurality of versions of the system service with a corresponding one of the random virtual address space layout of each of the first plurality of versions of the system service.

22. The computing device of claim 21, wherein:
the first request to execute the system service includes the system service identifier; and
means for randomly selecting a first version of the system service from the first plurality of versions of the system service comprises means for randomly selecting the first version of the system service from the first plurality of versions of the system service correlated with the system service identifier,
the computing device further comprising:
means for providing the first application with a first system service version identifier of the first version of the system service; and
means for receiving a request to execute the first version of the system service having the first system service version identifier from the first application.

23. The computing device of claim 22, further comprising:
means for locating a random virtual address of the first system service version using a correlation between the first system service version identifier and the random virtual address space layout of the first system service version;
means for translating the random virtual address of the first system service version to a physical address at which the data of the first version of the system service is stored; and
means for retrieving the data of the first version of the system service.

24. The computing device of claim 21, further comprising means for assigning a process identifier to each of the first plurality of versions of the system service, wherein the process identifier for each of the first plurality of versions of the system service is the same,
wherein:
means for assigning a random virtual address space layout to each of the first plurality of versions of the system service comprises means for assigning the random virtual address space layout to each of the first plurality of versions of the system service for each of the first plurality of versions of the system service assigned the process identifier;
means for assigning a system service version identifier to each of the first plurality of versions of the system service comprises means for assigning the system service version identifier to each of the first plurality of versions of the system service for each of the first plurality of versions of the system service assigned the process identifier; and
means for correlating the system service version identifier of each of the first plurality of versions of the system service to the system service identifier of a system service comprises means for correlating the system service version identifier of each of the first plurality of versions of the system service to the system service identifier of the system service for each of the first plurality of versions of the system service assigned the process identifier.

25. The computing device of claim 19, further comprising:
means for receiving a request to allocate code buffer space for dynamically generated code of an execution of the first version of the system service;
means for randomly selecting a code buffer address;
means for determining whether a code buffer space correlated with the code buffer address is large enough and available to store the dynamically generated code; and
means for storing the dynamically generated code at the code buffer address in response to determining that the code buffer space is large enough to store the dynamically generated code.

26. The computing device of claim 19, further comprising:
means for receiving a second request to execute the system service from a second application;
means for detecting the second request to execute the system service from the second application is an attack on the system service;
means for launching a second plurality of versions of the system service;
means for assigning a random virtual address space layout to each of the second plurality of versions of the system service, wherein the random virtual address space layout of each of the first plurality of versions of the system service and the random virtual address space layout of each of the second plurality of versions of the system service are different;
means for randomly selecting a second version of the system service from the first plurality of versions of the system service and the second plurality of versions of the system service; and
means for executing the system service using data of the second version of the system service.

27. The computing device of claim 19, wherein:
means for launching a first plurality of versions of a system service comprises means for launching each of multiple versions of the system service of the first plurality of versions of the system service on one of a plurality of heterogeneous processor cores having different instruction set architectures;
means for randomly selecting a first version of the system service from the first plurality of versions of the system service comprises means for randomly selecting a first heterogeneous processor core of the plurality of heterogeneous processor cores on which the first version of the system service is launched;
means for executing the system service using data of the first version of the system service comprises means for executing the system service by the first heterogeneous processor core; and
the computing device further comprises:
means for transferring the first request to execute the system service from the first application to the first heterogeneous processor core;
means for receiving an output of the execution of the system service by the first heterogeneous processor core; and
means for returning the output to the first application.

28. A non-transitory processor-readable storage medium having stored thereon processor-executable instructions configured to cause a processor of a computing device to perform operations comprising:

launching a first plurality of versions of a system service;

assigning a random virtual address space layout to each of the first plurality of versions of the system service;

receiving a first request to execute the system service from a first application;

randomly selecting a first version of the system service from the first plurality of versions of the system service; and executing the system service using data of the first version of the system service.

29. The non-transitory processor-readable storage medium of claim 28, wherein the stored processor-executable instructions are configured to cause the processor to perform operations further comprising:

receiving a second request to execute the system service from the first application;

randomly selecting a second version of the system service from the first plurality of versions of the system service; and executing the system service using data of the second version of the system service.

30. The non-transitory processor-readable storage medium of claim 28, wherein the stored processor-executable instructions are configured to cause the processor to perform operations further comprising:

assigning a system service version identifier to each of the first plurality of versions of the system service, wherein the system service version identifier of each of the first plurality of versions of the system service is different;

correlating the system service version identifier of each of the first plurality of versions of the system service to a system service identifier of the system service;

storing the correlations of the system service version identifier of each of the first plurality of versions of the system service and the system service identifier;

correlating the system service version identifier of each of the first plurality of versions of the system service with a corresponding one of the random virtual address space layout of each of the first plurality of versions of the system service; and storing the correlations of the system service version identifier of each of the first plurality of versions of the system service with a corresponding one of the random virtual address space layout of each of the first plurality of versions of the system service.

31. The non-transitory processor-readable storage medium of claim 30, wherein:

the first request to execute the system service includes the system service identifier;

the stored processor-executable instructions are configured to cause the processor to perform operations such that randomly selecting a first version of the system service from the first plurality of versions of the system service comprises randomly selecting the first version of the system service from the first plurality of versions of the system service correlated with the system service identifier; and the stored processor-executable instructions are configured to cause the processor to perform operations further comprising:

providing the first application with a first system service version identifier of the first version of the system service; and receiving a request to execute the first version of the system service having the first system service version identifier from the first application.

32. The non-transitory processor-readable storage medium of claim 31, wherein the stored processor-executable instructions are configured to cause the processor to perform operations further comprising:

locating a random virtual address of the first system service version using a correlation between the first system service version identifier and the random virtual address space layout of the first system service version;

translating the random virtual address of the first system service version to a physical address at which the data of the first version of the system service is stored; and retrieving the data of the first version of the system service.

33. The non-transitory processor-readable storage medium of claim 30, wherein the stored processor-executable instructions are configured to cause the processor to perform operations further comprising assigning a process identifier to each of the first plurality of versions of the system service, wherein the process identifier for each of the first plurality of versions of the system service is the same, and wherein the stored processor-executable instructions are configured to cause the processor to perform operations such that assigning a random virtual address space layout to each of the first plurality of versions of the system service, assigning a system service version identifier to each of the first plurality of versions of the system service, and correlating the system service version identifier of each of the first plurality of versions of the system service to a system service identifier of the system service occurs for each of the first plurality of versions of the system service assigned the process identifier.

34. The non-transitory processor-readable storage medium of claim 28, wherein the stored processor-executable instructions are configured to cause the processor to perform operations further comprising:

receiving a request to allocate code buffer space for dynamically generated code of an execution of the first version of the system service;

randomly selecting a code buffer address;

determining whether a code buffer space correlated with the code buffer address is large enough and available to store the dynamically generated code; and storing the dynamically generated code at the code buffer address in response to determining that the code buffer space is large enough to store the dynamically generated code.

35. The non-transitory processor-readable storage medium of claim 28, wherein the stored processor-executable instructions are configured to cause the processor to perform operations further comprising:

receiving a second request to execute the system service from a second application;

detecting the second request to execute the system service from the second application is an attack on the system service;

launching a second plurality of versions of the system service;

assigning a random virtual address space layout to each of the second plurality of versions of the system service, wherein the random virtual address space layout of each of the first plurality of versions of the system service and the random virtual address space layout of each of the second plurality of versions of the system service are different;

randomly selecting a second version of the system service from the first plurality of versions of the system service and the second plurality of versions of the system service; and executing the system service using data of the second version of the system service.

36. The non-transitory processor-readable storage medium of claim 28, wherein the stored processor-executable instructions are configured to cause the processor to perform operations such that:

launching a first plurality of versions of a system service comprises launching each of multiple versions of the system service of the first plurality of versions of the system service on one of a plurality of heterogeneous processor cores having different instruction set architectures;

randomly selecting a first version of the system service from the first plurality of versions of the system service comprises randomly selecting a first heterogeneous processor core of the plurality of heterogeneous processor cores on which the first version of the system service is launched; and executing the system service using data of the first version of the system service comprises executing the system service by the first heterogeneous processor core, and wherein the stored processor-executable instructions are configured to cause the processor to perform operations further comprising:

transferring the first request to execute the system service from the first application to the first heterogeneous processor core;

receiving an output of the execution of the system service by the first heterogeneous processor core; and returning the output to the first application.

* * * * *